(12) United States Patent
DuFaux et al.

(10) Patent No.: US 8,226,399 B2
(45) Date of Patent: Jul. 24, 2012

(54) EXTRUSION KIT AND EXTRUDER

(76) Inventors: Douglas P. DuFaux, Orchard Park, NY (US); Maurice Belisle, Huron Shores (CA)

( * ) Notice: Subject to any disclaimer, the term of this patent is extended or adjusted under 35 U.S.C. 154(b) by 0 days.

(21) Appl. No.: 12/484,733

(22) Filed: Jun. 15, 2009

(65) Prior Publication Data

US 2009/0309251 A1    Dec. 17, 2009

Related U.S. Application Data

(60) Provisional application No. 61/061,982, filed on Jun. 16, 2008, provisional application No. 61/117,088, filed on Nov. 21, 2008, provisional application No. 61/139,630, filed on Dec. 22, 2008.

(51) Int. Cl.
*B29C 47/06* (2006.01)
*B29C 47/54* (2006.01)

(52) U.S. Cl. .......... 425/376.1; 425/131.1; 425/462; 425/DIG. 57

(58) Field of Classification Search .......... 425/114, 425/DIG. 57, 131.1, 133.1, 376.1, 462; 264/173.11
See application file for complete search history.

(56) References Cited

U.S. PATENT DOCUMENTS

| 2,847,947 | A |   | 8/1958  | Pelletier et al. |
|-----------|---|---|---------|------------------|
| 2,874,649 | A |   | 2/1959  | Pelletier et al. |
| 3,157,933 | A |   | 11/1964 | Boggild et al.   |
| 3,987,558 | A | * | 10/1976 | Tsukamoto ............ 434/96 |
| 4,076,476 | A |   | 2/1978  | Ventura          |
| 4,993,932 | A | * | 2/1991  | D'Andrade .......... 425/154 |
| 5,267,863 | A | * | 12/1993 | Simmons, Jr. ....... 434/96 |
| 5,605,765 | A | * | 2/1997  | Rudick ............. 428/484.1 |
| 5,650,180 | A | * | 7/1997  | Kumada et al. ..... 425/376.1 |
| 6,602,066 | B1 |  | 8/2003  | Heayes           |
| 7,275,924 | B1 |  | 10/2007 | Kreuzer          |

OTHER PUBLICATIONS sweetoothsally, http://www.youtube.com/watch?v=M0LjEH77e3A Dec. 2006.*
Lollyologist, http://lollypix.blogspot.com/2006/12/sugar-sugars-handmade-lollies-on-food.html, Dec. 2006.*

* cited by examiner

*Primary Examiner* — Joseph Del Sole
*Assistant Examiner* — Ryan Ochylski
(74) *Attorney, Agent, or Firm* — Hodgson Russ LLP

(57) ABSTRACT

This invention provides methods and devices for manufacturing moldable materials including various types of natural and synthetic clays, edible materials such as cookie dough, and modeling compound by forming a moldable billet through various techniques, and reducing the cross section of said moldable billet such that features in the moldable billet appear in a similar arrangement in the resulting extruded product.

7 Claims, 20 Drawing Sheets

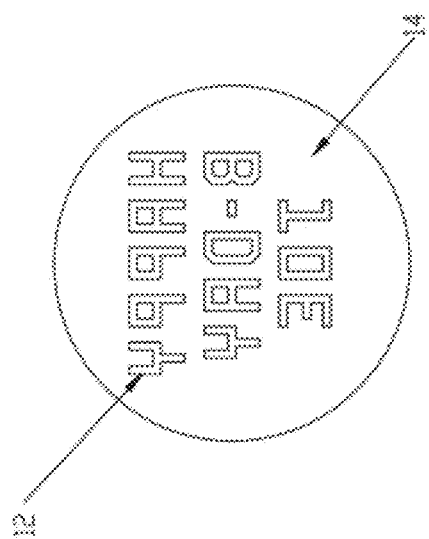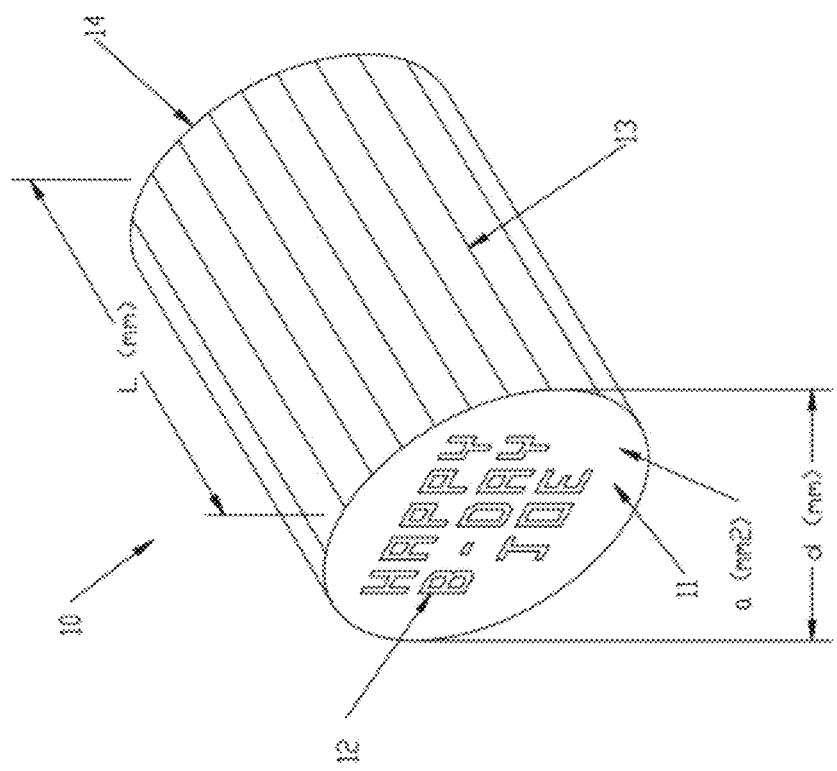

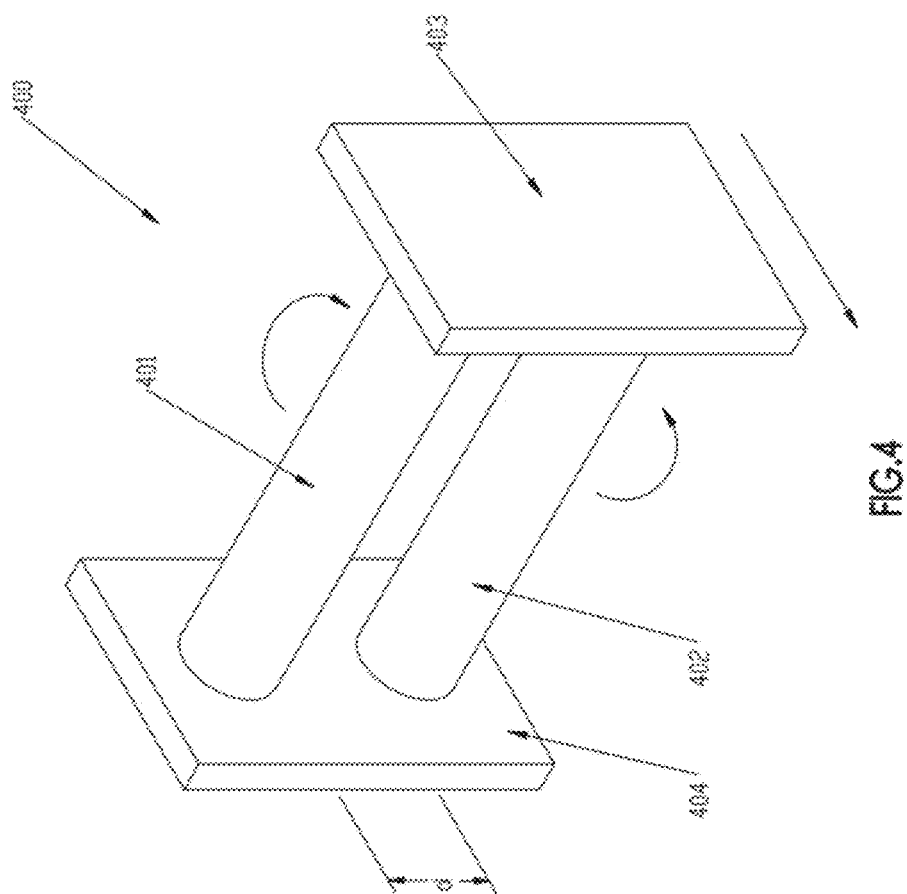

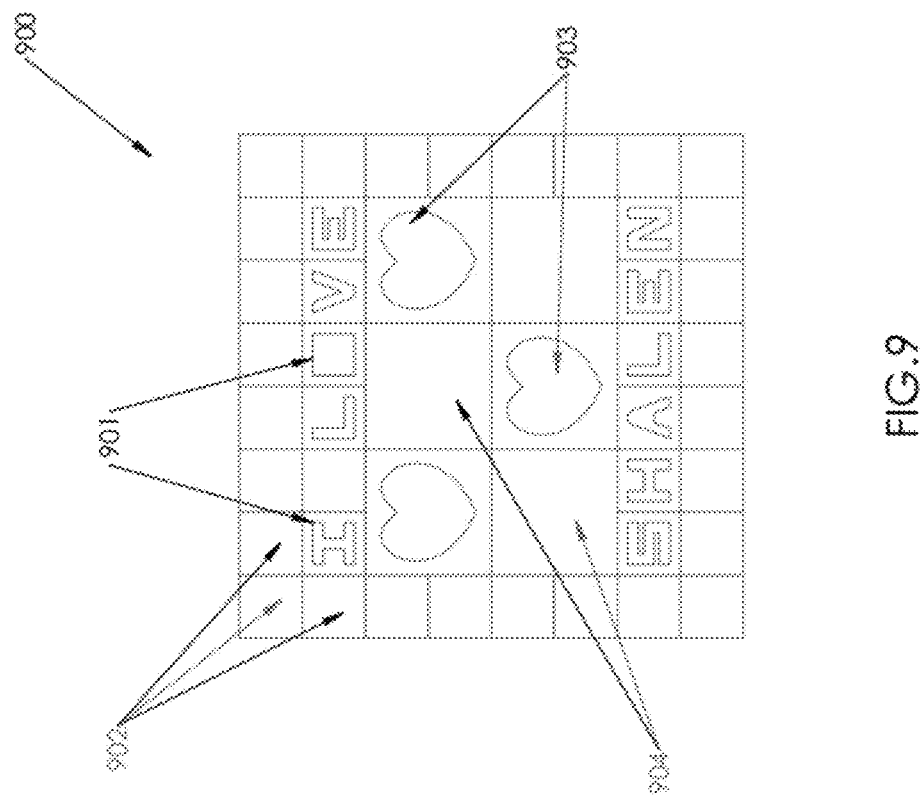

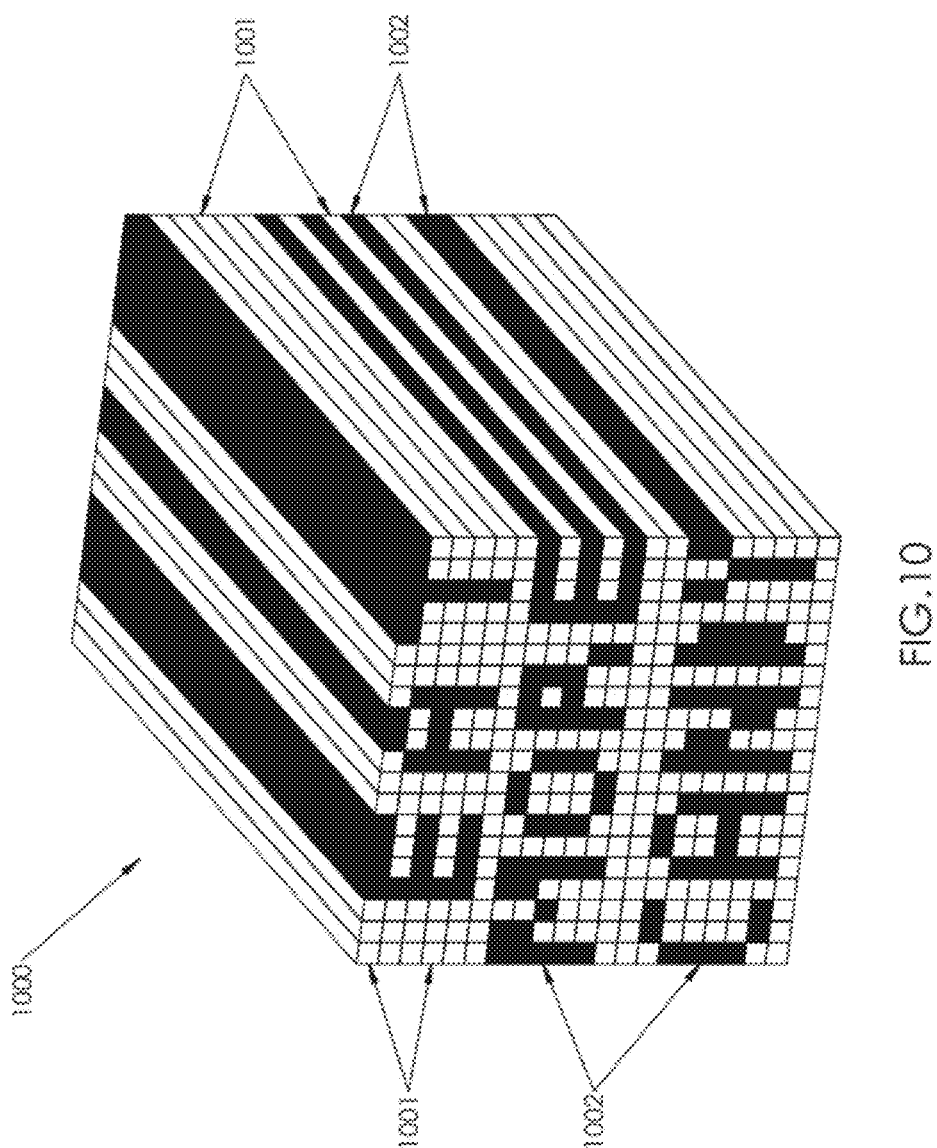

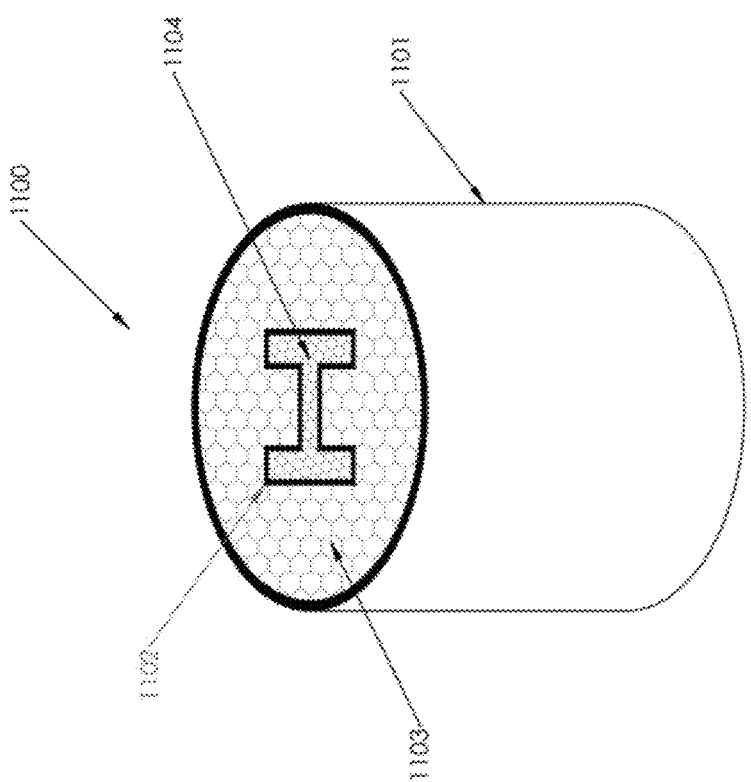

EXTRUSION KIT AND EXTRUDER

PRIORITY CLAIM

This application claims priority to and incorporates herein by reference the contents of each, in their entirety, U.S. Provisional Patent Application entitled EDIBLE CANDY PRODUCT AND METHOD FOR MAKING SAME with Ser. No. 61/061,982 and filed on 16 Jun. 2008, U.S. Provisional Patent Application entitled METHODS AND DEVICES FOR USE WITH MOLDABLE MATERIALS with Ser. No. 61/117,088 and filed on 21 Nov. 2008, and U.S. Provisional Patent Application entitled FORMING DEVICES AND METHODS FOR USE WITH MOLDABLE MATERIALS with Ser. No. 61/139,630 and filed on 22 Dec. 2008.

FIELD OF THE INVENTION

The present invention relates to methods for processing and devices for use with moldable materials such as moldable clays, moldable synthetic materials, and edible moldable materials.

BACKGROUND OF THE INVENTION

Moldable materials including various types of natural and synthetic clays, edible materials such as cookie dough, and modeling compound such as Play-doh (Registered Trademark of Hasbro, Inc.) and Model Magic (Registered Trademark of Crayola LLC) are very popular over a wide age group. Numerous other forms of moldable materials exist.

Considering the large quantities of related products sold throughout the world, there is always a strong market pull for new, different, and unusual toys or other devices that can be used with moldable materials, especially for products targeted at children. Many parents desire for their children to play with toys that include an educational element along with a creative element. Therefore, there have been many toy devices using letters and forms to help teach children the alphabet, words, and the like. The prior art has also taught a wide variety of devices that allow children to form moldable material into a variety of shapes and objects.

Extruders are one type of toy and are used to force a relatively unshaped form of moldable material through an opening or set of openings with a die or die set to create moldable material in various cross-sectional shapes.

Various extruders for such purpose have been previously described. For example, U.S. Pat. No. 3,157,933 to Boggild et al., U.S. Pat. No. 4,076,476 to Ventura, U.S. Pat. No. 6,602,066 to Heayes, and U.S. Pat. No. 7,275,924 to Kreuzer all disclose various toy extruders intended for use with soft moldable materials such as modeling compound to form strips or other elements having a variety of different cross-sections. The collective art teaches different methods for designing the extruder and that a plurality of dies may be employed to enable a child to remove and replace a die having a differently shaped opening whenever a different design or shape of molded article is desired. The designs vary in the level of sophistication, with '924 including an integrated extruder for extruding a quantity of a deformable moldable material. However, all prior art is designed to extrude simple shapes and forms from quantities of modeling compound.

It is desirable to be able to easily create more complex forms, including combining moldable materials with the ability to learn letters and words. It is therefore an object of the present invention to provide an improved device or moldable material forming process. It is also an object of the present invention to provide a system and process for making visually appealing forms and shapes with such device and process.

The present invention satisfies these objectives, and provides other advantages as described herein. Improved moldable material and devices, systems, and methods for providing an improved moldable material are provided.

SUMMARY

The present invention provides processes and devices for use with moldable materials such as moldable clays, moldable synthetic and natural materials, and moldable materials that are edible wherein a device of the present invention reduces the cross sectional area of a larger moldable material such that features in the larger moldable billet appear in a similar arrangement in the resulting smaller extrusion.

An extrusion kit is provided that includes an assortment of moldable segments selectable for arrangement by a user to create a moldable billet having a cross-sectional graphic distributed over a longitudinal extent of the moldable billet; and an extruder configured to receive the moldable billet, the extruder being operable to extrude the moldable billet to form an elongated extrusion wherein the cross-sectional graphic is substantially present in the extrusion in reduced scale. The assortment of moldable segments may include a plurality of moldable segments whose respective cross-sectional graphics collectively comprise all the letters of the alphabet and another plurality of moldable segments whose respective cross-sectional graphics collectively comprise all the numeric digits. The assortment of moldable segments may include at least one moldable stick segment having a first color and at least one other moldable stick segment having a second color different from the first color. The assortment of moldable segments may be capable of arrangement by the user as pixels to create the moldable billet having the cross-sectional graphic. The kit may further comprise a cutter operable to cut the elongated extrusion into a plurality of shorter pieces each exhibiting the cross-sectional graphic. In another embodiment, an extruder is provided that includes a cartridge with a pair of side walls connected by a bottom wall and a rear wall, the cartridge having an open front end and an open top; a hollow body removably receiving the cartridge, the hollow body including a tapered passage adjacent the open front end of the cartridge; a plunger including a plunger plate fitted to and received by the cartridge, a plunger rod extending through the rear wall of the cartridge to drivably engage the plunger plate, and a handle on the plunger rod at a location outside the cartridge, the handle being manually operable to advance the plunger rod and plunger plate in a forward axial direction toward the tapered passage; and a coupling member operable to releasably secure the cartridge and the hollow body against axially directed movement relative to one another; wherein a material to be extruded is loadable into the cartridge through the open top of the cartridge.

In another embodiment, a process for making an extruded product is provided that comprises the steps of forming a moldable billet, the moldable billet having a longitudinal axis and a cross-sectional graphic distributed over a longitudinal extent of the moldable billet; using an extruder to extrude the moldable billet to form an elongated extrusion having a cross-sectional area less than a cross-sectional area of the moldable billet; and cutting the elongated extrusion into a plurality of shorter pieces, wherein each piece substantially exhibits the cross-sectional graphic in reduced scale.

BRIEF DESCRIPTION OF THE DRAWINGS

The following detailed description of embodiments of the present invention can be best understood when read in conjunction with the following drawings, where like structure is indicated with like reference numerals and in which:

FIG. 1A is a perspective view of a piece of moldable material according to the invention.

FIG. 1B is a rear view of the piece of moldable material shown in FIG. 1A.

FIG. 4 is a view of a roller used in the production of moldable material according to an embodiment of the invention.

FIG. 9 shows a moldable billet according to an embodiment of the invention.

FIG. 10 is a perspective view of a moldable billet according to an embodiment of the invention.

FIG. 11 is a perspective view of a mold set used in the creation of moldable material according to an embodiment of the invention.

DETAILED DESCRIPTION OF EMBODIMENTS OF THE INVENTION

Figure 2:
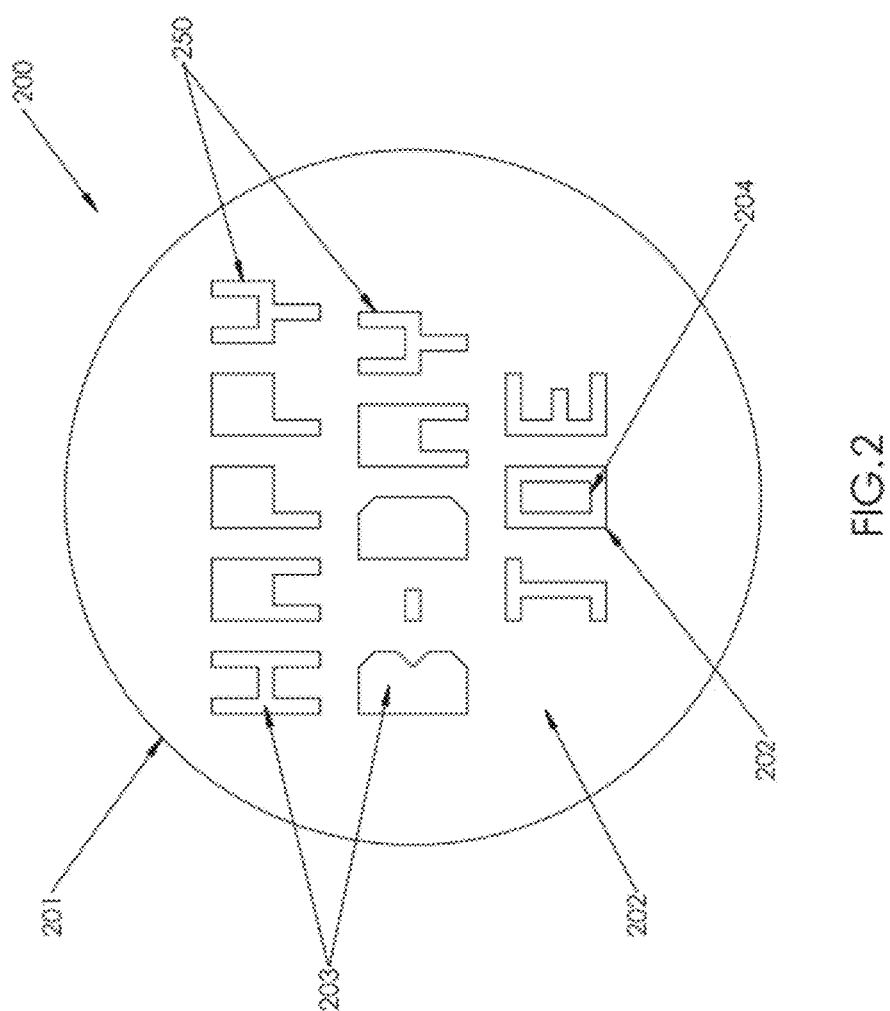
FIG. 2 is a top view of a mold and stencil set used in the production of moldable material according to one embodiment of the invention.

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are incorporated by reference in their entirety.

Unless otherwise indicated, all numbers expressing quantities of ingredients, properties such as weight fraction, reaction conditions, and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention. Notwithstanding that the numerical ranges and parameters setting forth the broad scope of the invention are approximations, the numerical values set forth in specific examples are reported as precisely as possible. Any numerical values, however, inherently contain certain errors necessarily resulting from error found in their respective measurements.

Devices, systems, and methods for producing moldable material forms are provided. The devices, systems, and methods may be used to produce a variety of moldable material arrangements. Moldable materials including various types of natural and synthetic clays, modeling compound, and edible materials such as cookie dough and candies, and other materials are all suitable to be used with the invention described herein. Hereinafter the term 'moldable material' is used generically to refer to all such materials and 'modeling compound' is occasionally used as a specific embodiment for convenience, but it should be noted that such embodiments are not restricted to modeling compound and may be applied to other moldable materials.

In one embodiment, production includes preparation of moldable material of differing colors, and depositing the materials through separate nozzles or other flow devices into a mold or mold set or mold and stencil or stencils, followed by optional reduction in the cross sectional area.

During production, it is preferred to provide as many separate moldable materials as there are colors in the desired final product. Thus, each moldable material mixture has a predefined color, such color being created as is currently practiced in the art and available in the market for use with the invention.

Referring now to the figures, FIG. 1(a) shows a view of a piece of moldable material 10 including the front face 11, back face 14 (not seen), and peripheral edge 13. The piece of moldable material 10 can have any shape such as circular, elliptical, square, rectangular, octagonal, and heart-shaped, to name a few. The piece of moldable material 10 further includes a set of predefined characters 12 that may be contained within the peripheral edge 13 or may touch and be part of the peripheral edge 13. The piece of moldable material 10 has a cross sectional area, (a) mm^2, a diameter of (d) mm, and a length of (1) mm, although it is important to note that the piece of moldable material 10 may or may not be round or of a uniform length across the face, and may be otherwise imperfect. The characters 12 spell the message "HAPPY B-DAY JOE." FIG. 1(b) shows a view of the back face 14 of the piece of moldable material 10, and the message appears as a 'mirror image' of what is seen when looking at the front face 11. In FIGS. 1(a) and 1(b) character 'Y' is used to draw attention to this reversed image.

FIG. 2 shows a mold 200 that includes an outer mold 201 and a set of stencils 250. The stencils 250 are arranged within the outer mold 201 to form the desired graphic, which may include letter or numeric characters, symbols, geometrical shapes, and/or any other desired shape. It is important to note that instead of the stencils 250, a solid form may be used as well. For example, a solid round, square, or any other shape segment of moldable material may be inserted within the outer mold 301. If forming a lower case letter 'i' a round rod may be used to form the dot in the letter, for example. Referring again to FIG. 2, an arrangement of stencils 250 are shown that form the phrase "HAPPY B-DAY JOE." The space between the inner surface of the outer mold 201 and the stencils 250 is referred to as the matrix void 202, and the space within each of the stencils 250 is referred to as the stencil void or voids 203.

After assembling the stencils 250 in the desired configuration within the outer mold 201, the next operation to produce a moldable billet according to a first embodiment of the present invention is to prepare the moldable materials, with the desired coloring(s), for insertion, by injecting, extruding, or pouring for example, into the outer mold 201 and stencils 250. It should be noted that the term 'moldable billet' refers to any moldable material form that can be extruded, including a loosely packed assembly of moldable segments, a densely packed assembly of moldable segments, or a single piece of moldable material.

Once the desired compounds are ready to insert into the matrix void 202 and the stencil voids 203, apparatus is arranged such that the desired compounds can be inserted into the proper locations. For example, to produce a 2-color moldable material of red characters and yellow matrix, apparatus is arranged such that one tube or multiple tubes are directed from the red moldable material vessel into one or more stencil voids 203, and one or more tubes is directed from the yellow moldable material vessel into the matrix void 202. Next, the moldable materials are directed to flow at a specified flow rate, from the vessels into the matrix void 202 and the stencil voids 203. Alternatively, during the filling process, each may be filled individually. Optionally, at this point the cross sectional area of the moldable billet is reduced through one of several processes. The cross sectional area may be reduced uniformly or it may be reduced in a non uniform manner, such that the graphic or pattern appearing in the moldable billet takes a different form from that contained within the moldable billet. In this way, fun shapes can be obtained in a similar way as a fun-house mirror can distort a reflection.

Figure 3C:
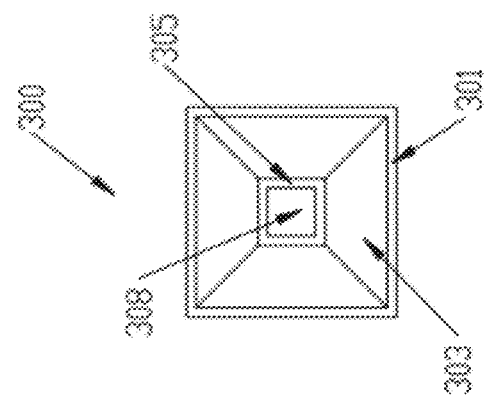
FIG. 3C is a front view of an extruder used in accordance with an embodiment of the present invention.

In one embodiment, the cross sectional area of the moldable material is reduced in an extruder. FIG. 3(a) shows one example of an extruder 300, and includes three primary sections (and corresponding hollow regions (zones) that are created within the physical sections of the extruder): a loading section 301, which generally defines a loading zone 302, a transition section 303, which generally defines a transition zone 304, and an exit section 305 which generally defines an exit zone 306. The extruder 300 also includes a plunger 307, which includes a plunger face 308. In use, a moldable billet is loaded into the loading zone 302 of the extruder 300. The internal diameter or cross section of the loading zone 302 is preferably close in dimension to that of the moldable billet, but larger such that the moldable billet fits into the loading zone 302 easily, but with as small a difference as practically possible. Once the moldable billet is loaded, the plunger 307 is used to push the moldable material from the loading zone 302 through the transition zone 303, into the exit zone 305 and then out of the extruder 300, with the plunger face 308 making contact with the moldable billet. The plunger 307 can be pushed by any suitable mechanical or human means. Sealing materials, o-rings, gaskets, and other devices may be included on the plunger to prevent or minimize the moldable material from leaking around the perimeter of the plunger.

The extruder 300 may be made of any suitable material that can withstand the required temperature and pressure to extrude the moldable material, which will vary depending on the type of moldable material. Preferably, the extruder 300 is made of metal or plastic.

Optionally, the extruder 300 may be heated. Heating may be accomplished through preheating or by wrapping the extruder 300 in a heating blanket, heating wires, operated under a heating lamp, or other device made to heat to a controlled temperature. Optionally, the heater may be built into the extruder 300 and may include insulation.

Figure 3B:
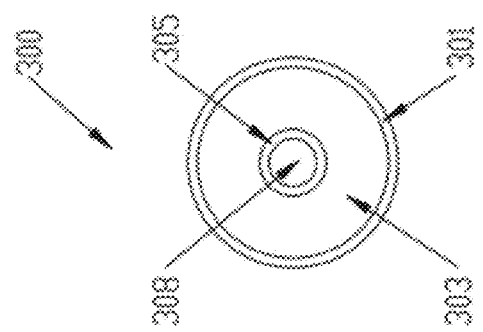
FIG. 3B is a front view of an extruder used in accordance with an embodiment of the present invention.
Figure 3A:
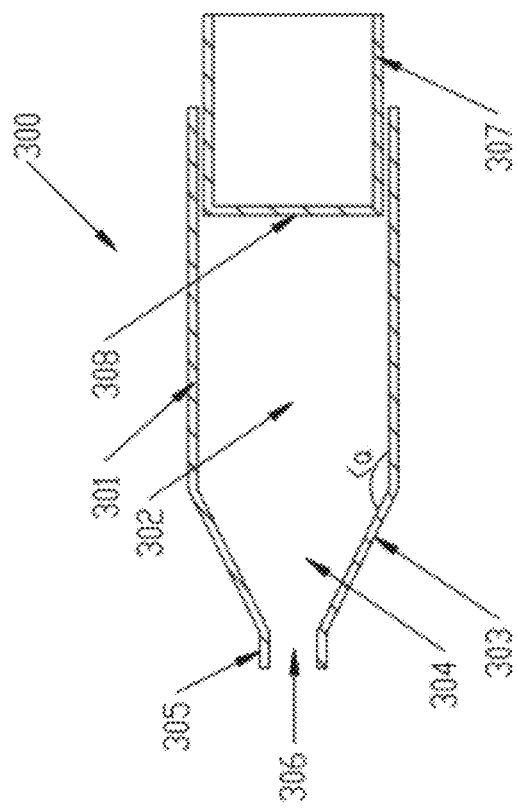
FIG. 3A is a cutaway side view of an extruder used in accordance with an embodiment of the present invention.

FIG. 3(b) shows a front view of an extruder 300 that has a circular design, which is convenient to use when making a round moldable material. FIG. 3(c) shows a front view of an extruder 300 that has a square or rectangular design, which is convenient to use when making a moldable material product that has a square or rectangular cross section.

In another embodiment, the cross sectional area of the moldable material may be reduced in a rolling device. In one embodiment, the roller is a 2-roller device as shown in FIG. 4. The rolling device 400 includes a top roller 401, a bottom roller 402, and two mounting devices or plates 403 and 404 on which the rollers are mounted and connected to suitable power devices or manual gears that can drive one or both of the rollers, and facilitate adjustment of the distance, d, between each of the rollers and the space between each of the mounting devices or plates 403 and 404. Such devices are well known in the art of material processing.

Generally, the rolling device 400 is used to reduce the cross sectional area of a square, a rectangle, or other moldable material shapes that include a plurality of flat sides. In use, the distance between the rollers is adjusted such that a reduction in dimension can be achieved and the moldable material is fed to the back side of the rolling device 400. Power or manual means is applied to cause one or both of the rollers to begin to rotate and the moldable material will then be pulled into the rolling device 400 and reduced in dimension as it passes through the rolling device 400. Optionally, the rollers may be heated or the device may be operated under a heat lamp or other heating means.

Figure 5:
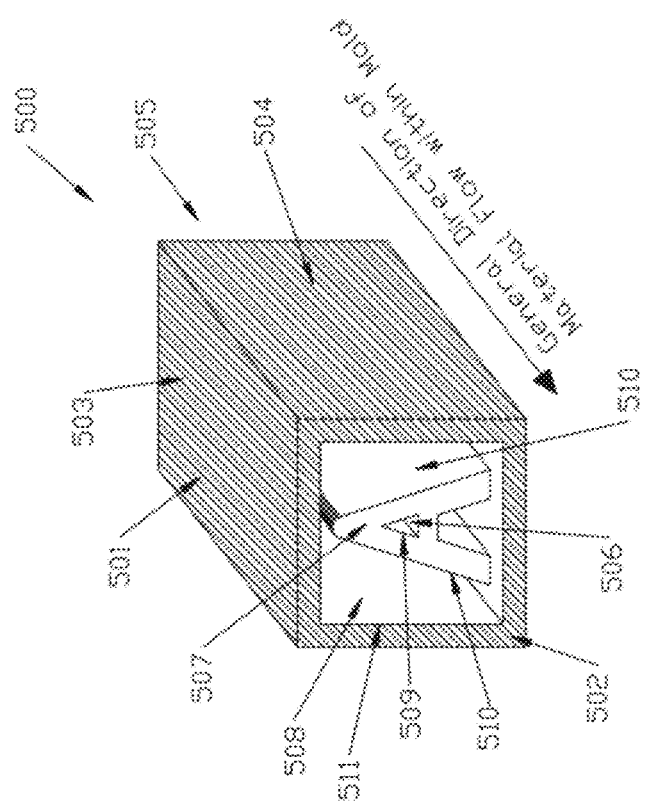
FIG. 5 is a perspective view of a mold used in the production of moldable materials according to an embodiment of the invention.

In another embodiment, moldable material forms are produced in a graphic mold. FIG. 5 shows a front perspective view of a graphic mold 500 for use with moldable materials.

The graphic mold 500 includes a mold body 501, a front face 502, a top side face 503, a right face 504, a rear face 505 (not seen), an inner mold cavity 506, a second mold cavity 507, an outer mold cavity 508, an inner mold wall 509, a second mold wall 510 and an outer mold wall 511. The graphic mold 500 can be made in any size. The mold can be made out of any suitable material, such as metal, plastic, composites, etc. The graphic mold 500 is preferably made of a rigid material, such as hard plastic, metal, or a strong composite material. Preferably, any surface of the material that contacts the moldable material near the front face of the graphic mold 500 is smooth. Although all surfaces that contact the moldable materials may be smooth, it may be beneficial to provide rough surfaces near the injection ports such that the high relative friction will cause a resistance to flow and facilitate the build-up of moldable material within the graphic mold 500 that is required to produce a high quality product.

The walls of the graphic mold 500 are designed such that the cavities created by the walls combine to form a specific shape, such as the shape of a letter, number, geometric shape, or other image. As shown in the figure, the inner mold wall 509 and second mold wall 510 form the letter "A" and the outer mold wall 511 forms a square or rectangle that generally outlines the letter "A" that can be seen inside of the graphic mold 500 when viewed generally from the front. The inner mold wall 509 and the second mold wall 510 are preferably less than 1 cm thick, more preferably less than 1 mm thick, and more preferably less than 0.5 mm thick. Thin walls allow the moldable material to easily combine and create a well formed mating region such that the desired image is clear in a product produced with the graphic mold 500.

Figure 6A:
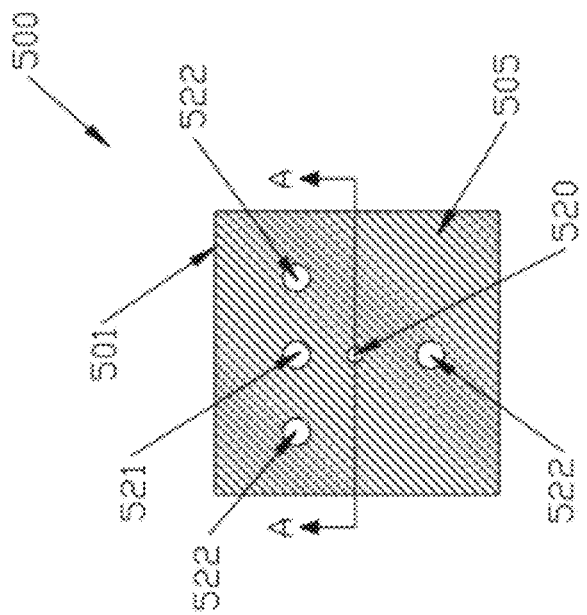
FIG. 6A is a front view of a mold used in the production of moldable materials according to an embodiment of the invention.

FIGS. 6(a) and (b) show a front and rear view, respectively, of the graphic mold 500 shown in FIG. 5. In the view of FIG. 6(a), the following elements of the graphic mold 500 can be seen: the mold body 501, the front face 502, the inner mold cavity 506, the second mold cavity 507, the outer mold cavity 508, the inner mold wall 509, the second mold wall 510, the inner cavity injection port 520, the second cavity injection port 521, and the outer cavity injection ports 522. Also shown in the figure is the reference line A-A, which is a line of reference for the cross-sectional drawing of the graphic mold 500 that is shown in FIG. 7.

Figure 6B:
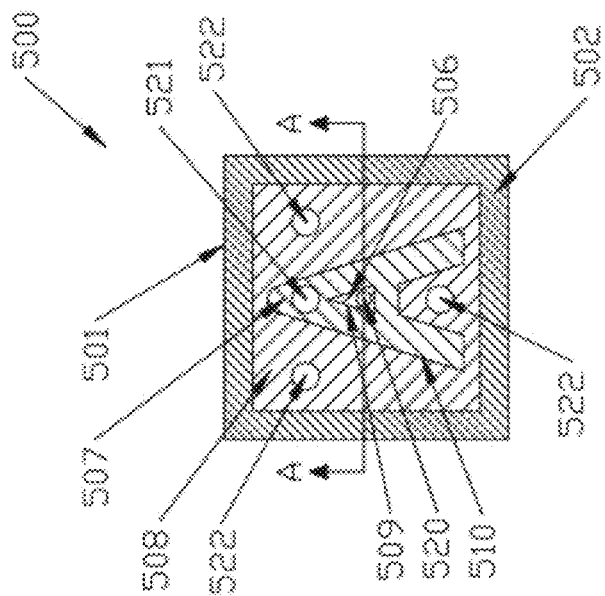
FIG. 6B is a rear view of a mold used in the production of moldable materials according to an embodiment of the invention.

In the view of FIG. 6(b), the following elements of the graphic mold 500 can be seen: the mold body 501, rear face 505, inner cavity injection port 520, second cavity injection port 521, and outer cavity injection ports 522. Also shown in the figure is the reference line A-A, which is the line of reference for the cross-sectional drawing of the graphic mold 500 that is shown in FIG. 7.

Figure 7:
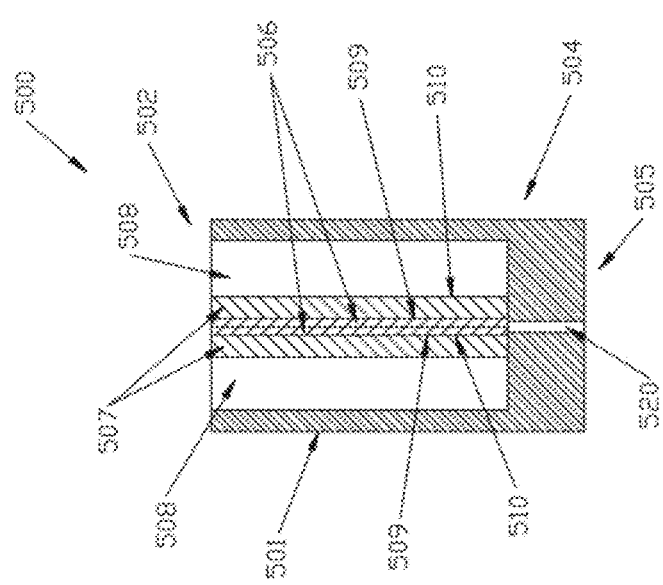
FIG. 7 is a cross sectional view of a mold used in the production of moldable materials according to an embodiment of the invention.

FIG. 7 shows a cross sectional view of the graphic mold 500 shown in FIGS. 5 & 6. The image shows a cross section of the plane A-A that is shown in FIG. 6, which is a section through the length of the graphic mold 500. In this cross-sectional image, the following elements of the graphic mold 500 can be seen: the mold body 501, inner mold cavity 506, second mold cavity 507, outer mold cavity 508, inner mold wall 509, second mold wall 510, and inner cavity injection port 520. Also shown in the figure are indications of the location of the rear face 505, the right side face 504, and the front face 502, none of which are shown but are included to help orient the reader.

In use, pipe, tubing, or other flow components are connected to the inner cavity injection port 520, second cavity injection port 521, and outer cavity injection ports 522, at or near the point where the injection ports meet the rear face 505, such that the desired moldable material or materials may be injected into the graphic mold 500. In one embodiment, each injection port is connected through a tube to a storage vessel that contains the moldable material that will be injected into the portion of the mold connected to the injector port or ports. Typical devices and equipment may be used to force the moldable material from the storage vessel or vessels through the tubing and into the graphic mold 500. This includes traditional pumps that are designed for such high viscosity materials, piston-cylinders that force material to flow, and fluid pressure that would force a material from the storage vessel.

For example, to produce a 2-color modeling compound of red character "A" and yellow matrix, apparatus is arranged such that one tube or multiple tubes are directed from a storage vessel containing red modeling compound vessel into the tube that is connected to the second cavity injection port 521, and one or more tubes is directed from the yellow modeling compound storage vessel into the tubes that are connected to the inner cavity injection port 520 and the outer cavity injection ports 522. Next, the modeling compound is directed to flow at a specified flow rate, from the storage vessels into the inner mold cavity 506, second mold cavity 507, and outer mold cavity 508. As the red and yellow modeling compound flows into each cavity, flow resistance causes the material to generally fill the entire cavity, flowing generally towards the front face 502 of the graphic mold 500, as indicated in FIG. 5.

As the material continues to be forced into the graphic mold 500, it will eventually generally fill each of the cavities and flow out of the mold at the front of the graphic mold 500. If the material has a high enough viscosity or otherwise resists flowing due to gravity, it will emerge from the mold in the form of a continuous body that has a cross section that is generally the same shape as the opening in the graphic mold 500 (square or rectangular as shown in FIG. 5 through FIG. 7) and will contain the letter "A" in red moldable material with other sections being yellow. As long as material is forced into the mold, the moldable material will come out of the mold in a continuous manner (creating a continuous form), and all that will be seen is the outer most portion of the modeling compound. This graphic segment may be cut at any point and the face of the newly cut graphic segment will contain the image of the letter "A."

It should be noted that the graphic mold 500 can have any shape such as circular, elliptical, square, rectangular, octagonal, and heart-shaped, to name a few. This applies to the overall shape of the graphic mold 500 and/or to the shape of the outer mold cavity 508 that is a result of the shape of the outer mold wall 511, such that the resulting product produced with the graphic mold 500 takes this shape. The graphic mold 500 can be made at any size, for example the cross section of the material produced directly by the mold may range from a few square millimeters to over a square meter, but preferably about 5 to about 1000 square centimeters. Preferably the graphic mold 500 makes a larger cross sectional area than required for the final product, which is then reduced in cross section to the final desired size for example by use of an extruder or roller as described herein.

Optionally, the graphic mold 500 can be connected directly to a device that will reduce the cross sectional area, such as an extruder 300 or roller 600. For example, the output end of the graphic mold 500 shown in FIGS. 5 through 7, at or near the front face 502 can be connected directly to the loading end of an extruder 300 such that material exiting from the graphic mold 500 enters directly into the loading zone 302 of the extruder 300. Preferably, the size of the moldable material exiting the graphic mold 500 is approximately the same size as the internal section of the extruder 300. When operating in this manner, several advantages exist. First, the pumps or other injection force used to inject the moldable material into the graphic mold 500 is used to force the material all the way through the extruder 300, such that additional mechanical devices are not required. Second, a plunger and related parts are not required. Third, production can be accomplished faster, as it occurs in a single stage, and thus reducing material handling time. Fourth, manufacturing the graphic mold 500 in a larger size is easier, as is forming the connections at the injector ports, as is flowing material into the mold, because moldable materials are difficult to flow in small tubes or other flow components thus allowing faster production rates.

When connecting the graphic mold 500 to an extruder 300, o-rings or other seals may be employed such that no, or a minimal quantity, of moldable material leaks from the connection spot between the graphic mold 500 and extruder 300.

Optionally rollers may be employed to apply a minor reduction to the final product exiting the extruder 300 to make final adjustments to the product size and/or to finish the surface of the graphic segment.

Figure 8C:
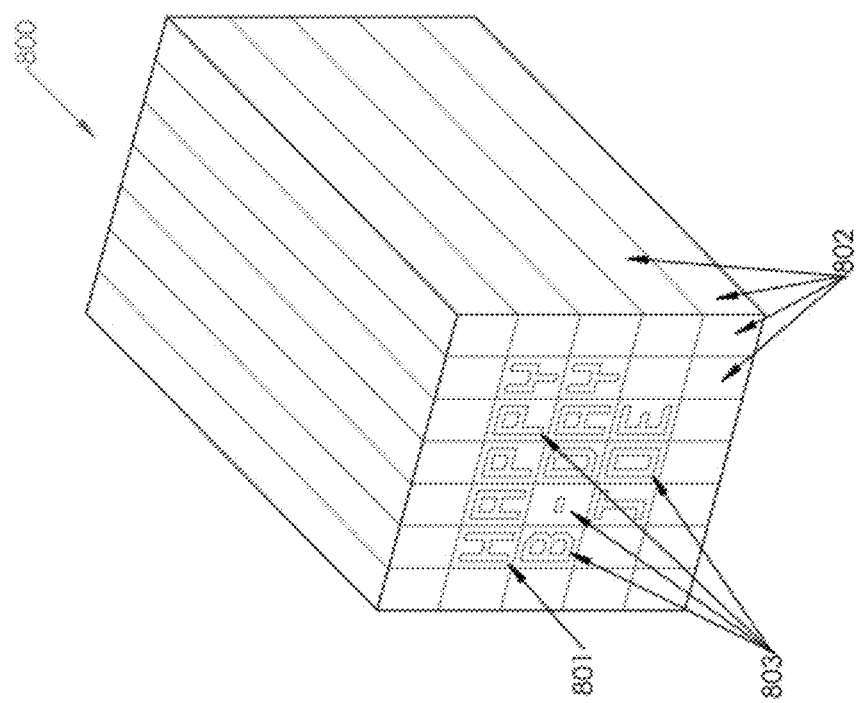
FIG. 8C shows a moldable billet used in the creation of moldable material according to an embodiment of the invention.
Figure 8B:
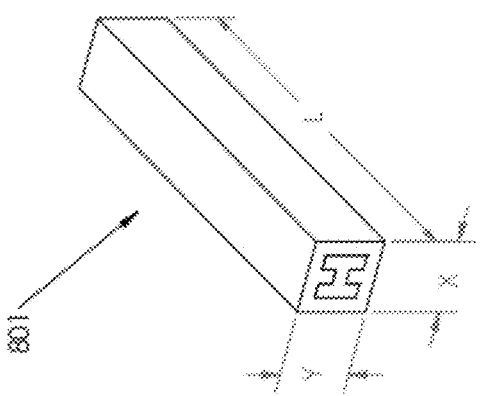
FIG. 8B is a perspective view of a moldable material segment produced according to one embodiment of the invention and used in the creation of a moldable billet according to one embodiment of the invention.

A further embodiment of the invention is shown in FIG. 8. FIG. 8(*a*) shows a front view of a graphic segment 801 including a letter character "H" therein that was produced through an embodiment as described above. FIG. 8(*b*) shows a perspective view of the same graphic segment 801. The graphic segment 801 has a defined cross sectional area and in this embodiment the graphic segment 801 is generally square. The length of the graphic segment 801 is defined by the desired length of the moldable billet 800 that will be created in the process to be described. FIG. 8(*c*) shows a moldable billet 800 that includes 35 individual segments—a mix of color segments 802 and graphic segments 803; the graphic segments 803 collectively containing characters creating a textual message spelling "HAPPY B-DAY JOE" in the moldable billet 800 when viewed generally from the front.

At this point the moldable billet 800 is a loose assembly of color segments and can be processed to produce a solid or "fused" moldable billet, for example by applying pressure, and then optionally reduced in cross sectional area as described above. The moldable billet 800 can also be directly reduced in diameter as described above if desired.

This embodiment of "building" custom moldable material forms allows a user, such as a child, to create custom moldable material forms in a simple manner. Color segments and graphic segments with a variety of characters and other shapes made be made by a central processing facility in volume, or they made be made by the user. Features such as hearts, or animal shapes, etc. that require a larger size may be made in various sizes. For example, FIG. 9 shows a moldable billet 900 that includes 1 cm×1 cm graphic segments 901 (containing letters), 1 cm×1 cm color segments 902, 2 cm×2 cm graphic segments 903 (containing heart images) and 2 cm×2 cm color segments 904. This embodiment allows a broad range of graphics to be incorporated into the desired moldable material.

In one embodiment of the invention, a graphic segment with predetermined character or characters or other features or combination of features contained therein can be made in a high speed process. The process begins with the preparation of the moldable material of as many desired colors and formulations as desired. At this point, the moldable materials are forced to flow into a mold that includes an outer mold, of a predefined shape, and inner molds that form the characters or other features within the mold. As opposed to some of the earlier embodiments described herein, the inner molds in this embodiment are made of typical mold materials, such as metal or plastic, and can be solid or hollow.

Optionally, the inner molds are coated with a release agent and/or made of a material that allows rapid release, such as Teflon (a registered Trademark of Dupont). At this point in the process the inner mold or molds are released and then filled with the desired moldable material.

The next step is to reduce the cross sectional area of the moldable material in such a way to substantially maintain the character or characters and/or other feature or features in the moldable material. The reduced diameter moldable material shapes (the graphic segments) can be sized to a predefined length and optionally coated with a handling and/or storage material and optionally stored in moisture tight containers. These shapes can be used directly or used to create custom moldable material configurations as described earlier herein.

In a further embodiment of the invention, color segments of moldable material are assembled into a block to create a moldable billet with predefined shapes therein. In one mode of operation, each segment of moldable material is a solid color, such as red, blue, green, white, etc (a "color segment"). The size of the color segments are determined by the desired resolution of the image or graphic that will appear in the moldable billet. For example, if a resolution of 1 mm is desired, 1 mm diameter color segments (if round) or 1 mm×1 mm color segments (if square color segments are used). Similar to how individual single color pixels are used to build an image on a computer or other type of monitor, color segments are assembled to build a desired image with respect to a front view of the assembly (the moldable billet), and said image is limited only by the resolution, which is equal to the size of the moldable material color segments. Along with the resolution of the color segments, the size of the moldable billet being produced limits the type and quality of the graphic being produced.

An example of this embodiment of the invention is shown in FIG. 10. FIG. 10 shows a perspective view of a moldable billet 1000 of color segments, each of a solid color, where two colors are used, a light color segment 1001, and a dark color segment 1002, and assembled to create a set of words spelling "EAT MORE CANDY" when viewed generally from the front. The moldable billet shown in FIG. 10 includes 400 color segments, 20 segments by 20 segments. Each light color segment 1001 and dark color segment 1002 has a generally defined cross sectional area and in this embodiment is generally square, as is the moldable billet 1000. The length of each color segment is defined by the desired length of the moldable billet 1000 that will be created in the process to be described.

The moldable billet 1000 can be processed to produce a solid or 'fused' moldable billet, for example by applying pressure depending on the properties of the moldable material, and then reduced in cross sectional area as described above. The moldable billet 1000 can also be directly reduced in diameter as described above if desired.

In one embodiment, a moldable billet is made in an automated process where a robotic or other automated device picks a color segment of predefined color, type, flavor (if an edible moldable material is used), etc. from one of various holding bins and places into the moldable billet. In this manner, a moldable billet can be constructed quickly and requiring little to no human labor. A micro-controller or computer would be used in such a system to control the pick-and-place operation and may optionally be interfaced to an input device that allows a user to draw a desired graphic.

In another embodiment of the invention, moldable material beads, chips, or other fragments are used to create a moldable billet. FIG. 11 shows a moldable billet 1100 that includes an outer bead mold 1101, an inner bead mold 1102 in the form of a letter "H," moldable material beads 1103 filling the space between the outer bead mold 1101 and inner bead mold 1102, and moldable material beads 1104 filled within the inner bead mold 1102. The inner bead mold 1102 may be made of thin metal or plastic, or may be a stencil made of moldable material as described earlier. Note that a variety of moldable material forms other than beads, such as fragments, can be used.

In use, one or more inner bead molds 1102 are assembled into the outer bead mold 1101 in the desired configuration, for example spelling a message or name if letter characters are used. Moldable material beads 1103 or other moldable material fragments of desired color or colors and flavor or flavors are poured into and filling the space between the outer bead mold 1101 and inner bead mold 1102. Moldable material beads 1104 of desired color(s) or formulation(s) are inserted into and filling the inner bead mold or molds 1102. The inner bead mold 1102 is pulled out of the moldable billet. Because the inner bead mold 1102 is thin, it will minimally affect the location of the moldable material beads 1103 and 1104, such that the general shape of the characters or other shapes or figures remain. Next, the moldable billet is subjected to pressure and/or heated such that the moldable material beads or other fragments fuse or combine together to some acceptable degree. If desired, the moldable billet can now be reduced in cross sectional area.

EXAMPLES

Example 1

Extrusion of Modeling Compound

To demonstrate the process of producing an extrusion with a textual message contained therein, a small-scale system was constructed and tested. The system employed an extruder, a cutting mechanism, an electric-motor driven pusher for the extruder plunger, and an electric-motor driven conveyor. In operation, several steps are required to produce the final desired product.

In the first step, the extruder was used to produce blank pieces of modeling compound of a desired dimension (the "color segments"). Several hundred color segments of yellow modeling compound and several hundred color segments of blue modeling compound were made, each being generally square with sides about 7.2 mm in length, and each cut to an overall length of about 100 mm. This is discussed in Example 1—Part A.

In the second step, the color segments produced under the first step were used to create a moldable billet that included 6×6 color segments, for a total of 36 color segments, that formed an alphanumeric character when viewed generally from the front. This moldable billet was extruded with an extruder and numerous segments of modeling compound were made, each being generally square with sides about 7.2 mm in length, and each cut to an overall length of about 100 mm, and each containing a letter within (a graphic segment), as described herein. This is discussed in Example 1—Part B.

Next, in the third step, the graphic segments produced under the first and second steps were used to create a moldable billet that included 6×6 segments (a mix of color and graphic segments), for a total of 36 segments, that formed a textual message when viewed generally from the front. This is discussed in Example 1—Part C.

In Example 1—Part D, we describe the use of an extruder with a larger opening at the exit section.

Example 1

Part A—Extrusion of Modeling Compound Color Segments

Figure 12:
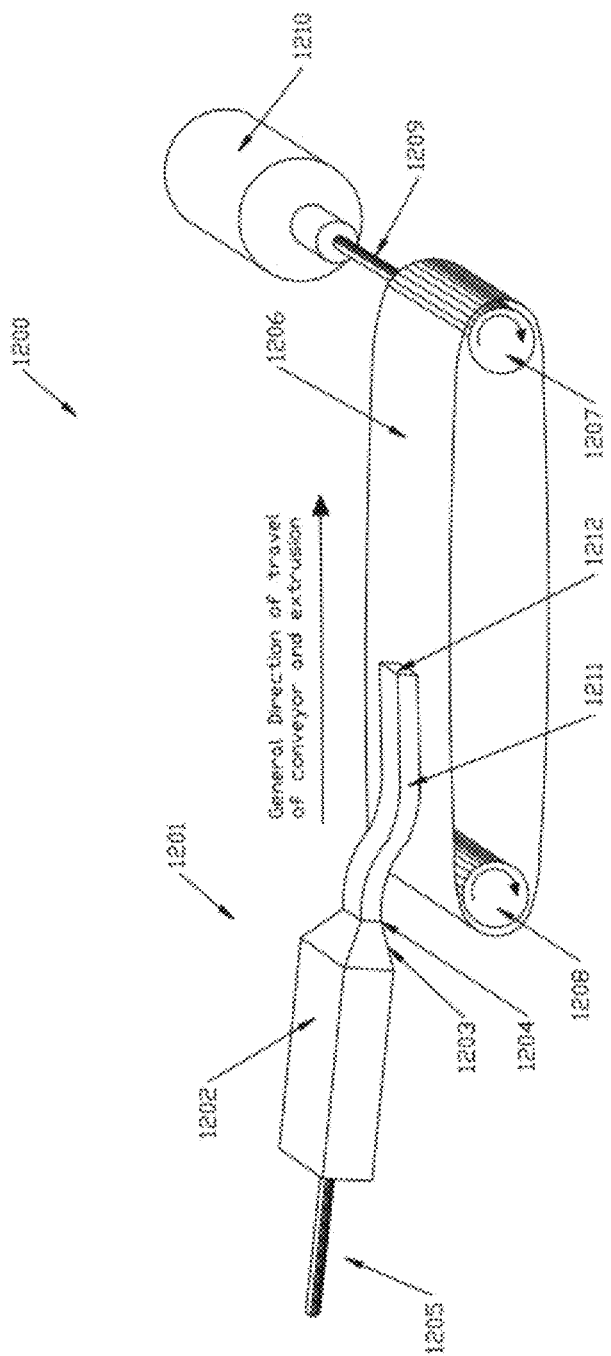
FIG. 12 is a view of a system used in the production of moldable materials according to an embodiment of the invention.

FIG. 12 shows a schematic of the system 1200 as it operated. It includes a square cross-section extruder 1201 generally of the design shown in FIGS. 3(*a*) and 3(*c*) with a loading section 1202, a transition section 1203, an exit section 1204, a plunger (not shown), a plunger push rod 1205, a conveyor belt 1206, a conveyor drive roller 1207, a conveyor free roller 1208, a drive shaft 1209, a drive motor 1210, along with an extruded product 1211 (and extruded product face 1212) which was Play-doh brand modeling compound for this example.

The extruder 1201 was made of PVC about 2.5 mm in thickness and had a square shape, with slightly rounded corners. The internal dimensions of the loading section 1202 was 46 mm by 46 mm and was 200 mm in length, the length of the transition section 1204 was 50 mm, the length of the exit section was 2 mm. The resulting angle between the loading section 1202 and transition section 1204 (angle a, as noted in FIG. 3), was about 22 degrees. This extruder 1201 was used to produce a generally square extrusion and had an opening at the exit section 1204 of the extruder 1201 of approximately 6.4 mm per side (the "small extruder").

Color segments were made by loading the extruder 1201 with the appropriate color modeling compound (yellow or blue in this demonstration), inserting the plunger, and applying pressure to the plunger push rod 1205. In this demonstration, a RIGID brand battery powered electric caulking gun (Model R8804) was used to apply consistent pressure to the plunger push rod 1205. The extruded modeling compound exited the extruder as the extruded product 1211 at about 2.2 cm/s and the conveyor belt 1206 was set to move at a consistent speed of about 2.0 cm/s using the electric motor 1210 that was attached to a conveyor roller 1207. The extruded product 1211 was allowed to maintain a length of about 40 to 50 cm on the conveyor belt 1206, and 10 cm segments were cut off using a razor blade (the type used in common utility knifes and box cutters) after the continuous length reached about 50 cm, such that at least about 40 cm of the continually extruding material remained on the conveyor belt.

It should be noted that the inventors have discovered that the size of the extruded product 1211 can be controlled in part by the speed of the modeling compound exiting the extruder 1201 relative to the speed of the conveyor belt 1206. In this example, the slower relative speed of the conveyor belt caused the extruded product 1211 to slight build up or expand and result in an extruded product 1211 that is larger than the size of the opening at the exit section 1204 of the extruder 1201.

Example 1

Part B—Extrusion of Modeling Compound Graphic Segments

Figure 13:
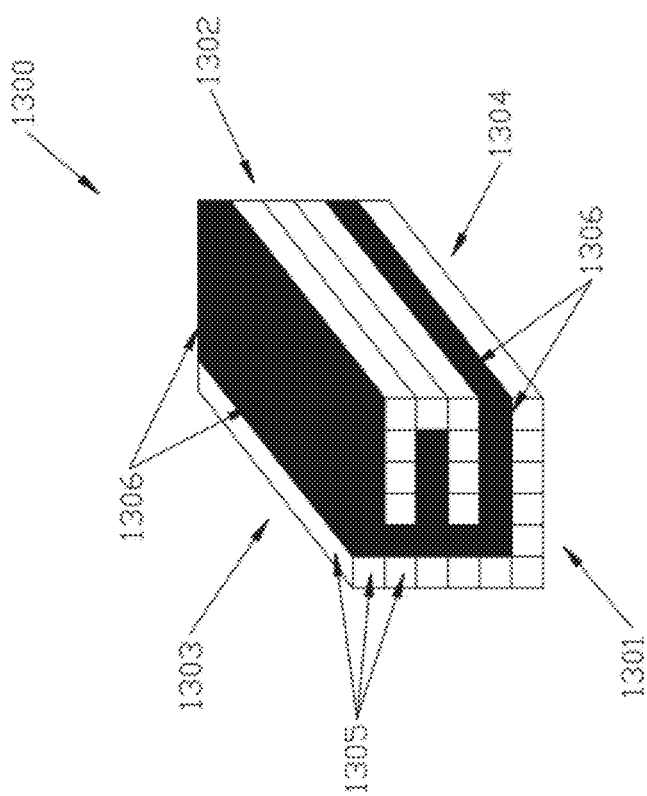
FIG. 13 shows a perspective view of moldable billet according to an embodiment of the invention.

The blue and yellow color segments as produced using the method and equipment discussed in Example 1—Part A above were used to create a moldable billet 1300 that included 6×6 segments, for a total of 36 segments, that formed the letter "E" when viewed generally from the front. FIG. 13 shows a schematic representation of the moldable billet 1300 that includes a front face 1301, rear face 1302, top face 1303, and right face 1304. The bottom face and left face are not indicated. The moldable billet 1300 was made up of a stack 6 color segments wide (between the right and left face of the moldable billet) and 6 color segments high (between the bottom face and top face) as shown in FIG. 13. The formation of the letter "E" is created through the placement of light (yellow) and dark (blue) segments. Shading in the figure indicates the location of the blue segments 1306 and the segments that are not shaded indicate the placement of the yellow segments 1305. We use the term "matrix color" to describe the use of the color yellow here, with the color blue forming the image of the letter (the "image color").

The finished moldable billet 1300 was gently compressed on the top/bottom face and the left/right face to ensure an easy fit into the extruder 1201. After the compression, the moldable billet 1300 measured approximately 45 mm per side and was inserted into the extruder 1201.

Using the same extruder 1201 and procedure and operating parameters as discussed above in Example 1—Part A, the moldable billet 1300 was forced through the extruder 1201 to make segments, each being generally square with sides about 7.2 mm in length, and each cut to an overall length of about 100 mm. Each of these segments contained the same pattern of yellow and blue portions through the length of each segment, and therefore were miniaturized versions (each being approximately 7.2 mm square by 100 mm in length) of the moldable billet shown in FIG. 13. These segments were stacked for later use. When viewed generally from the front show, each graphic segment contained an image of the letter "E."

Repeating this procedure, several graph segments were made, including graphic segments including the letters "H" "A" "P" "Y" "B" "D" "A" "J" "E" and "O" as well as the symbol "-." Each using the darker color blue as the image color, and the color yellow as the matrix color.

Example 1

Figure 8A:
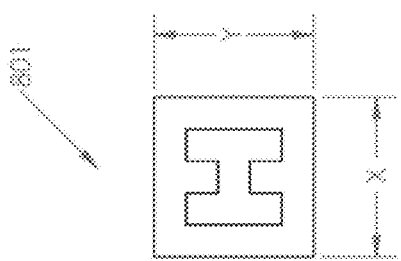
FIG. 8A is a view of a moldable material rod produced according to one embodiment of the invention and used in the creation of a moldable billet according to one embodiment of the invention.

Part C—Extrusion of Modeling Compound Color Segments and Graphic Segments with a Textual Message The graphic segments containing an alphanumeric character as produced using the method and equipment discussed in Example 1—Part B along with the color segments as produced sing the method and equipment discussed in Example 1—Part A were combined to create the moldable billet 800 shown in FIG. 8. FIG. 8(a) shows a front view of the segment for letter "H", and FIG. 8 (b) shows a perspective view of the segment for letter "H." FIG. 8 (c) shows the moldable billet, similar to the moldable billet 1300 of FIG. 13, but now the previously produced graphic segments are arranged to spell a message of "HAPPY B-DAY JOE." The blank segments are yellow color segments.

Using the same extruder and procedure and operating parameters as discussed above in Example 1—Part A and Part B, the moldable billet 800 was forced through the extruder 1201 to make segments, each being generally square with sides about 7.2 mm in length, and each cut to an overall length of about 100 mm. Each of these segments contained the same pattern of yellow and blue modeling compound which appears as a reduced size replication of the moldable billet 1300; the message "HAPPY B-DAY JOE" is clearly visible with the naked eye within the extruded product 1211. In this case, each letter is only approximately 1 mm in size, but very clear. The inventors estimate that resolutions on the order of 10 to 100 micro-meters or better are possible with the processing techniques taught in this patent application.

Example 1

Part D—Extrusion of Modeling Compound Graphic Segments with a Textual Message—Larger Extruder Considering that one use for the invention described herein is for a child's toy, the size of the extruded product 1211 may be desired to be larger. To demonstrate, a large extruder was used to extrude a moldable billet similar to that shown in FIG. 8.

The extruder 1201 with a larger opening at the exit section 1204 produces a generally square extrusion and has an opening at the exit section 1204 of the extruder 1201 of approximately 10 mm per side. The extruder 1201 was identical to the smaller extruder used in Part A, Part B, and Part C of this example, except for the length of the transition section 1202 and the size of the opening at the end of the exit section 1204, each as noted below.

The extruder 1201 was a square cross-section generally of the design shown in FIGS. 3(a) and 3(c), including a loading section 1202, a transition section 1203, an exit section 1204, a plunger (not shown), a plunger push rod 1205, a conveyor belt 1206, a conveyor drive roller 1207, a conveyor free roller 1208, a drive shaft 1209, a drive motor 1210, along with a extruded product 1211 (and extruded product face 1212).

The extruder 1201 was made of PVC about 2.5 mm in thickness and had a square shape, with slightly rounded corners. The internal dimensions of the loading section 1202 was 46 mm by 46 mm and was 200 mm in length, the length of the transition section 1204 was 40 mm, the length of the exit section was 2 mm. The resulting angle between the loading section 1202 and transition section 1203 (angle a, as noted in FIG. 3), was about 22 degrees. This extruder 1201 was used to produce a generally square extrusion that had an opening at the exit section 1204 of the extruder 1201 of approximately 10 mm per side.

After inserting the moldable billet 800 into the extruder 1201, the plunger was inserted. Pressure was applied to the plunger push rod 1205. In this demonstration, a RIGID brand battery powered electric caulking gun (Model R8804) was used to apply consistent pressure to the plunger push rod. The extruded product 1211 exited the extruder at about 1.2 cm/s and the conveyor belt 1206 was set to move at a consistent speed of about 1.2 cm/s using the electric motor 1210 that was attached to a conveyor roller 1207. The extruded product 1211 was allowed to maintain a length of about 30 to 40 cm on the conveyor belt 1206, and 10 cm segments were cut off using a razor blade (the type used in common utility knifes and box cutters) after the continuous length reached about 40 cm, such that at least about 30 cm of the continually extruding material remained on the conveyor belt. Each segment clearly contained the message "HAPPY B-DAY JOE" and was about 10 mm by 10 mm in size on the front face, and about 100 mm in length.

Example 2

Manual Extruder

Figure 14:
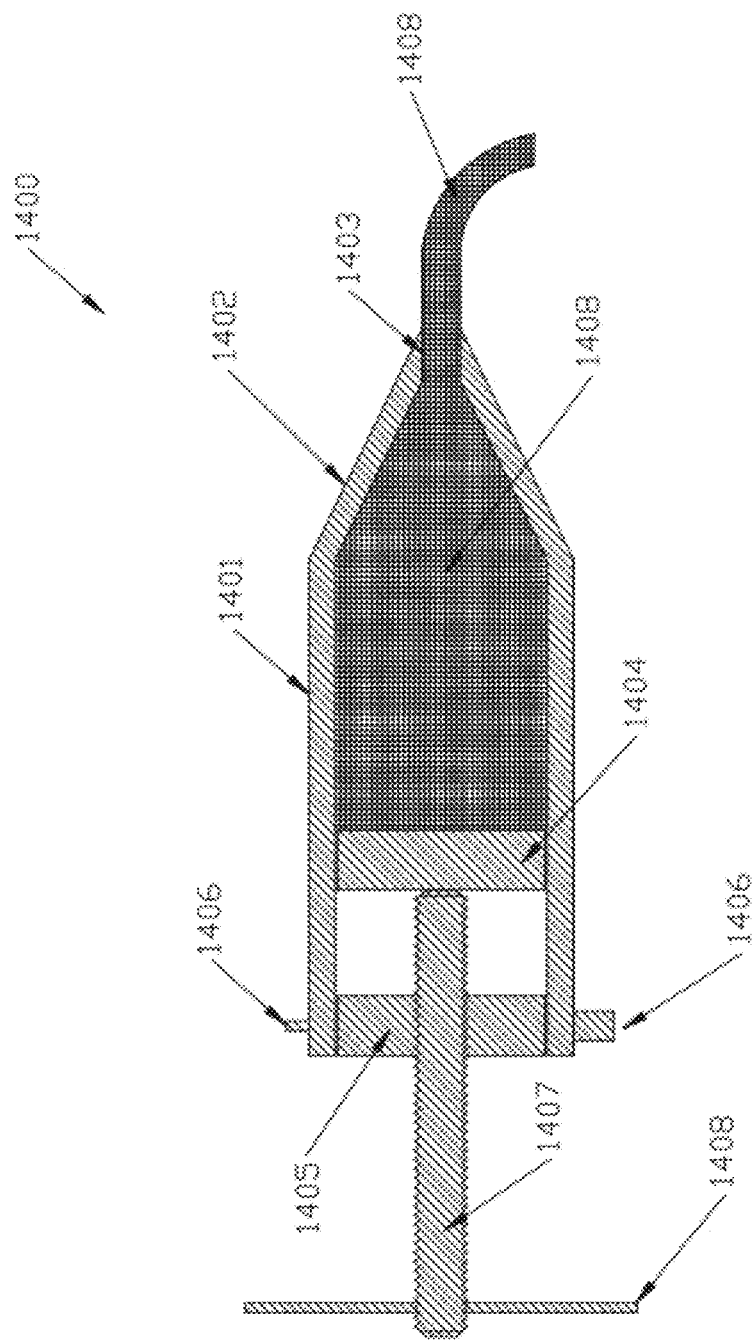
FIG. 14 is a cutaway side view of an extruder used in accordance with an embodiment of the present invention.

FIG. 14 shows a cross-sectional view of a manually powered extruder that was built to refine an extruder that could be easily operated (requiring little force to cause material to extrude) when using modeling compound.

The manual extruder 1400 was made of PVC about 2.5 mm in thickness and had a square shape, with slightly rounded corners. The internal dimensions of the loading section 1401 was 46 mm by 46 mm and 200 mm in length. The axial length of the transition section 1402 was about 40 mm and the length of the exit section 1403 was 2 mm. The resulting angle (angle a) between the loading section 1401 and transition section 1402 (angle a), as noted in FIG. 3, was about 22 degrees. The opening at the exit section 1403 of the manual extruder 1400 was square, and the length of each side was about 12 mm, and thus a cross sectional area of about 144 square millimeters.

The manual extruder 1400 also included a plunger plate 1404, a base plate 1405 that was attached to the end of the loading section 1401 by a set of pins 1406 (one pin shown). The base plate 1405 was designed to be easily removed by removing the pins 1406 such that the manual extruder 1400 could be easily loaded with modeling compound. The center of the base plate 1405 was drilled-and-tapped for a ½-13 thread (½ inch by 13 thread-per-inch commonly available threading). A ½-13 PVC threaded rod 1407 was threaded through this tapped hole, and served as the push rod to force the plunger plate 1404. The plunger plate 1404 was 12 mm thick and about 0.2 mm smaller in dimension than the loading section 1401 so that it easily fit in the loading section 1401. The manual extruder 1400 also included a handle 1408 that was fixed to the PVC threaded rod 1407 to make turning the PVC threaded rod 1407 easier.

In operation, the manual extruder 1400 was first loaded with an amount of modeling compound 1408 through the opening in the loading section 1401, then the plunger plate 1404 was inserted into the loading section 1401. Next, the base plate 1405 was inserted into the opening of the loading section 1401 and fixed in place by inserting pins 1406 through holes located near the end of the loading section 1401 and through the base plate 1405. At this point, the PVC threaded rod 1407 with handle 1408 was threaded into the base plate 1405 and turned until the PVC threaded rod 1407 made contact with the plunger plate 1404.

With the plunger plate 1404 making contact with the modeling compound 1408, further turning of the PVC threaded rod 1407 caused the molding compound 1408 to be extruded (forced out of the opening in the exit section 1403 of the manual extruder 1400). When operated horizontally as shown, an extrusion first exits the extruder and then begins to sag due to gravity (unless otherwise supported).

The inventors have found that this design for a manual extruder 1400 is extremely easy to use and can be operated by small children. In fact, the inventors could use as little as 2 fingers to grasp the handle 1408 and turn the PVC threaded rod 1407 to extrude significant quantities of material.

Example 3

Extrusion of Modeling Compound in a Round Extruder

Figure 15:
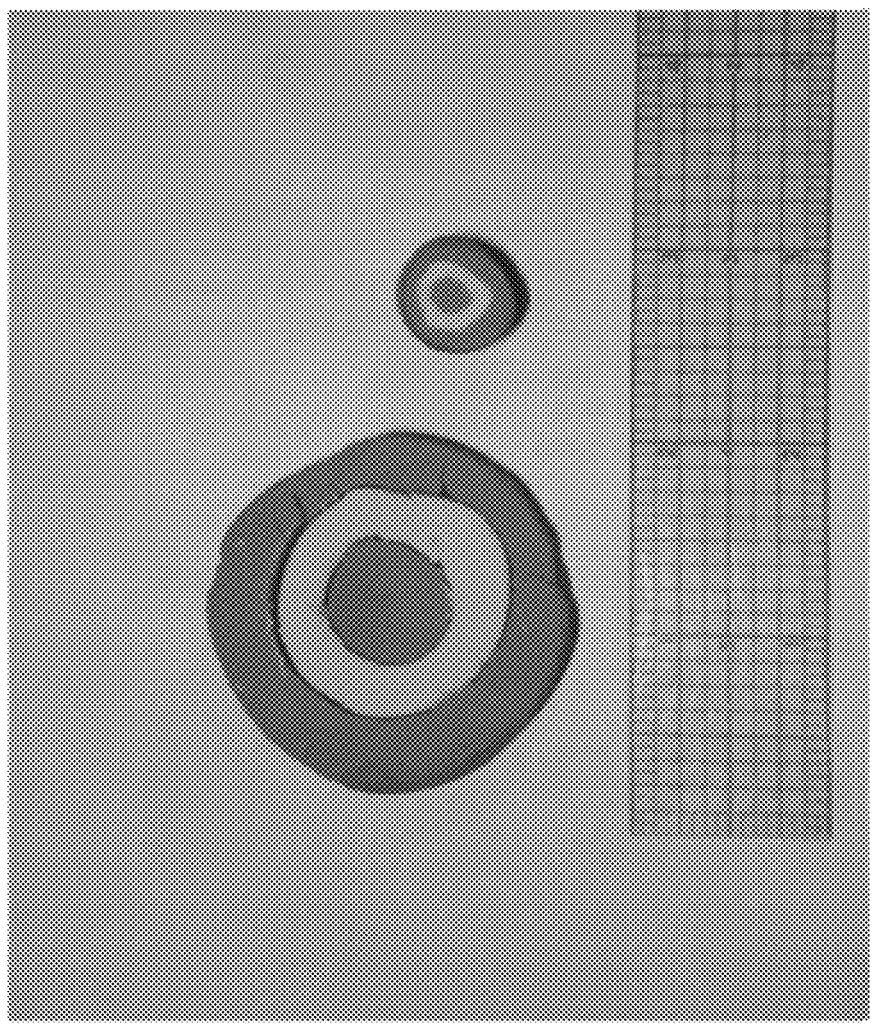
FIG. 15 shows a photograph of a moldable billet and an extruded product according to an embodiment of the invention.

FIG. 15 shows one example of a piece of moldable material (Play-doh brand modeling compound in blue and white purchased off-the-shelf from Target Corporation) that has been substantially uniformly reduced in cross section using a round extruder. The figure includes a larger segment of modeling compound on the left side of the image approximately 1.75 inch (4.45 cm) in diameter that was assembled by hand, along with the reduced cross section modeling compound on the right side of the image approximately 0.5 inch (12.7 cm) in diameter. The ruler shown has a scale of inches. The smaller segment of modeling compound was produced by extruding the larger segment in an extruder of a design similar to that shown in FIGS. 3(*a*) and 3(*b*), having a round cross section. In the extruder used in this example, the loading section 301 was approximately 4 inches (10.2 cm) long, the transition section 303 was approximately 4 inches (10.2 cm) long, and the exit section 305 was approximately 0.1 inches (0.25 cm) long. This results in an approximate angle (a) of 171 degrees. The extruder was made of a flexible type plastic. Extrusion was performed at room temperature of about 19 C and the extruder was not heated.

Modeling compound in the general cross sectional form shown in FIG. 15 was loaded into the extruder. The segment was approximately 3.5 inches (8.9 cm) long. Next, the plunger 307 was inserted into the loading section 301 and was then pushed into the modeling compound to force the modeling compound from the loading zone 302 through the transition zone 304, into the exit zone 306 and then out of the extruder, with the plunger face 308 making contact with the modeling compound. The plunger was pushed by an electric device (a RIGID brand battery powered electric caulking gun (Model R8804). It should be noted that although an electronically actuated device to push the plunger is convenient and primarily used to force the plunger, small amounts of material were extruded manually by hand using a wooden dowel as a push-rod. No sealing materials, o-rings, gaskets, or other devices were used, but considering the tight fit between the flexible plastic plunger and the internal wall of the loading section, only minimal modeling compound leaked around the perimeter of the plunger.

As seen in FIG. 15, a cross-sectional reduction from about 2.4 sq. inch (15.5 cm^2) to about 0.2 sq. inch (1.3 cm^2), which is slightly more than 10× is achieved in this device. With such a reduction, the 3.5 inches (8.9 cm) of initial material length was converted into about 35 inches (89 cm) of material with reduced cross section. A sharp instrument (a box-cutter type razor blade in this case) was used to cut the material and divide it into approximately 4 inch (10.2 cm) lengths that may be used to build a set of letters as discussed above in reference to FIG. 8, for example.

These final shapes may also be dried (by various methods including leaving exposed to air or in an oven) to make parts that are somewhat durable, for ornamental use such as in a necklace or as a display piece, or other purposes. If the material used were an edible product, it may be served directly or cooked (such as baking) prior to being served for consumption.

Example 4

Thin-Walled Tube Extruder

A thin walled plastic tube extruder was used to demonstrate the ability to extrude uniformly in compact designs. The extruder was round and had an outside diameter of 38.1 mm at the loading section. The loading section was 150 mm in length and the thickness of the extruder wall was 0.40 mm. The transition section had 2 stages, the first reduced the internal diameter from about 37.3 mm to about 16.5 mm in about 10.2 mm length, and the second stage reducing this 16.5 mm diameter to 6 mm in about 28 mm of length.

Because this extruder employed very thin walled plastic material, it could not be operated as earlier examples because it would simply buckle under any load. Therefore, to extrude modeling compound, the inventors simply rolled the end of the loading section onto itself, in a manner identical to how a tube of toothpaste is commonly rolled up as it is consumed.

Example 5

Extruder Assembly

Figure 16:
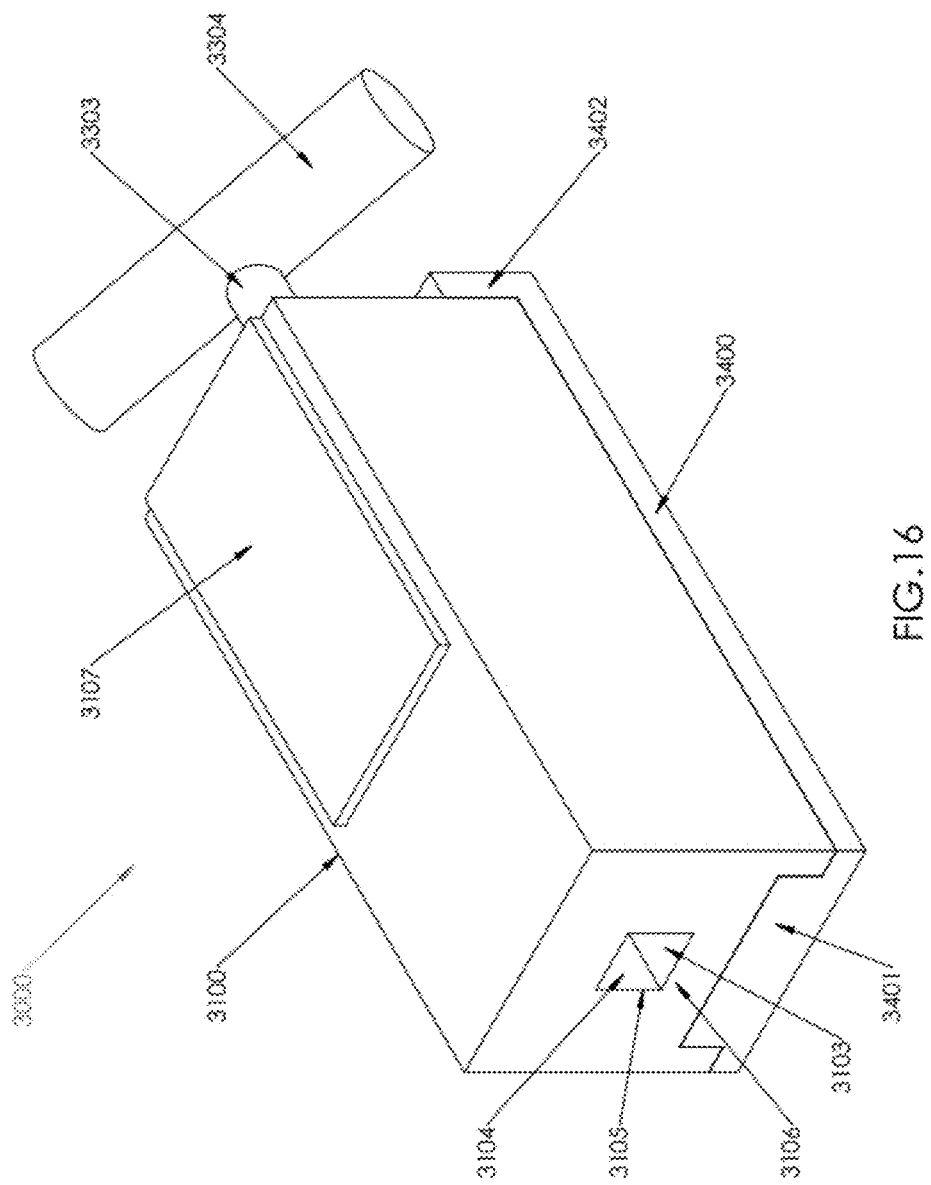
FIG. 16 shows a perspective view of an extruder assembly used in accordance with an embodiment of the present invention.

FIG. 16 shows a perspective view of an extruder assembly 3000 that provides easy operation for use with modeling compound.

Figure 17:
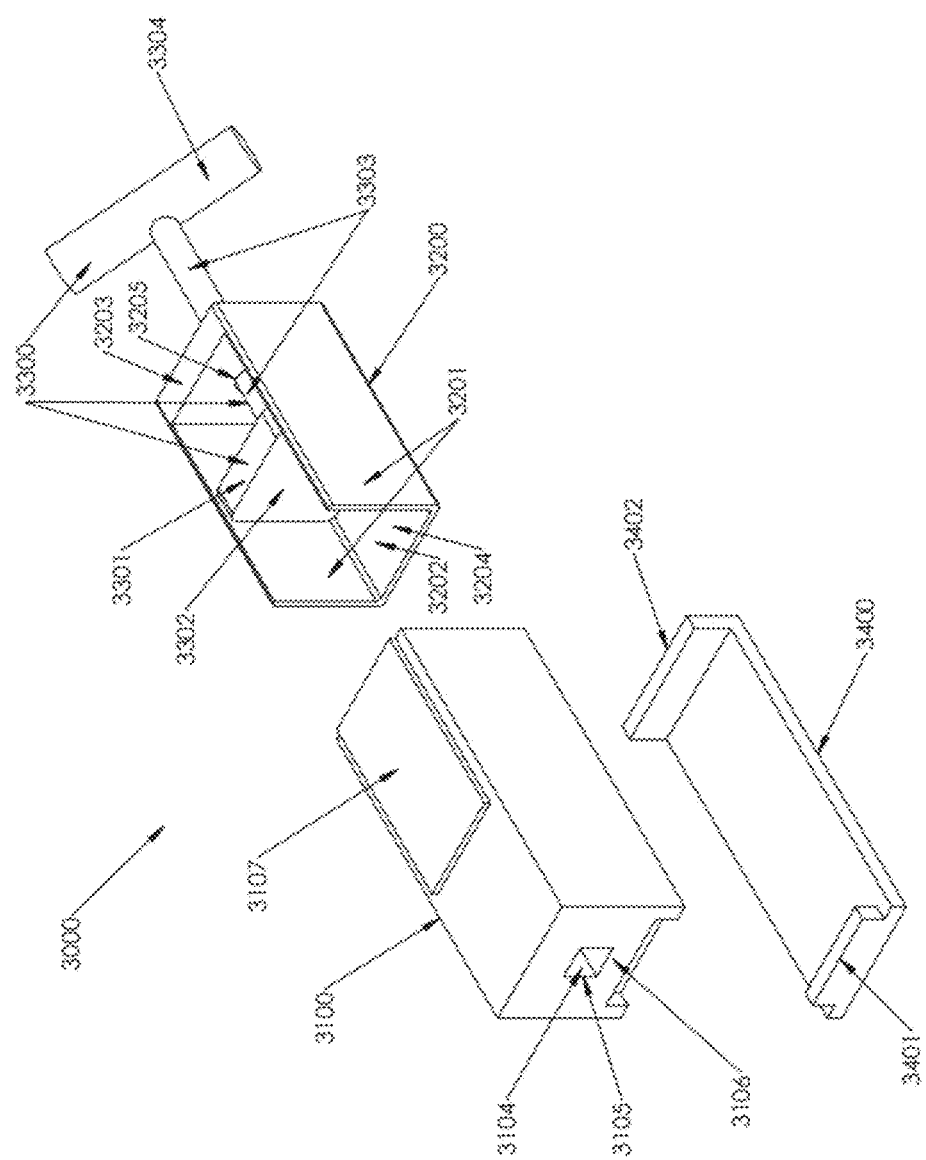
FIG. 17 shows an exploded view of an extruder assembly used in accordance with an embodiment of the present invention.
Figure 18:
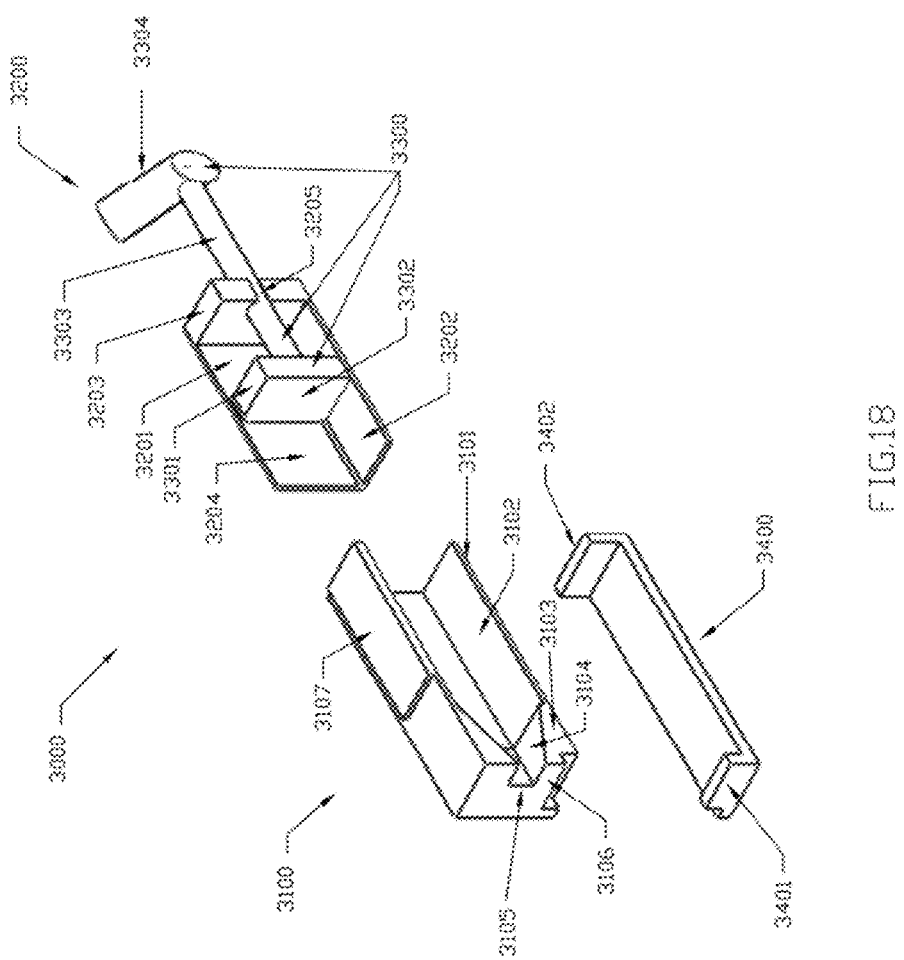
FIG. 18 is an exploded cutaway side view of an extruder assembly used in accordance with an embodiment of the present invention.

FIG. 17 shows an exploded view of the extruder assembly 3000 that provides easy operation for use with modeling compound. The extruder assembly 3000 includes an extruder 3100, a cartridge 3200, a plunger assembly 3300 and a coupling member 3400. FIG. 18 shows an exploded sectional view of the extruder assembly 3000.

Referring to FIGS. 16 through 18, the extruder 3100 includes three primary sections: a loading section 3101, which generally defines a loading zone 3102, a transition section 3103, which generally defines a transition zone 3104, and an exit section 3105 which generally defines an exit zone 3106. The extruder 3100 also includes a modeling compound pressing plate 3107 which is integrated into the extruder 3100 as a protrusion on the top surface of the extruder 3100.

The extruder 3100 is generally square with outer dimension approximately 55 mm×55 mm×140 mm in length. The extruder 3100 is made of high density polyethylene (HDPE) and has a wall thickness of approximately 2 mm, such that the dimensions of the loading zone 3102 are 50 mm×50 mm. The length of the loading section 3101 and loading zone 3102 is 100 mm long, the length of the transition section 3103 and the transition zone 3104 is 40 mm, and the length of the exit section 3105 and exit zone 3106 is 1 mm. The size of the exit zone is 15 mm×15 mm, resulting in a cross-sectional area of 225 square mm. The resulting angle (angle a as referred to in FIG. 3) between the loading zone 3102 and transition zone 3104 is 22 degrees.

The cartridge 3200 is generally square in shape and has outer dimensions that are slightly smaller than those of the loading zone 3102 such that the cartridge 3200 can be inserted entirely into the loading zone 3102 of the extruder 3100. The cartridge 3200 includes a pair of side walls 3201 connected by a bottom wall 3202 and a rear wall 3203; the cartridge 3200 has an open front end and an open top. The space between the side walls 3201 generally defines the cartridge loading zone 3204. The dimensions of the cartridge loading zone are 46 mm×48 mm×90 mm. A tapped hole 3205 in the rear wall 3203 with a ½-13 thread is included in the cartridge 3200. The cartridge 3200 allows for easy loading of modeling compound color segments and graphic segments through the open top and open front, as well as a method of fastening the plunger assembly 3300 as described below.

The plunger assembly 3300 includes a plunger plate 3301 which includes a plunger face 3302, a plunger rod 3303, and a handle 3304. The plunger plate 3301 fits snugly within the cartridge 3200 and is flush with the top of the cartridge. When the cartridge 3200 is inserted into the loading zone 3102 of the extruder 3100, the outer dimensions of the plunger plate 3301 are such that it contacts the surface of the loading zone 3102 through the open top of the cartridge 3200 to prevent moldable material from leaking during extrusion. The plunger rod 3303 is a ½-13 threaded rod which is threaded through the tapped hole 3205 in the cartridge 3200, and serves as the push rod to force the plunger plate 3301 forward. The handle 3304 is fixed to the end of the plunger rod 3303 to make turning of the threaded rod 3303 easier.

The coupling member 3400 consists of a plate with a forward detent 3401 and a rear detent 3402 which when in position against the extruder 3100, prevents the cartridge 3200 from separating from the extruder 3100 due to pressure that builds when material is extruded. The unfolded dimensions of the coupling member 3400 are approximately 55 mm wide×160 mm long×2.5 mm thick.

In operation, the plunger face 3302 is fully retracted and a moldable billet is loaded into the cartridge 3200. Next, optionally, the pressing plate 3107 of the extruder 3100 is used to flatten the top side of the modeling compound so that it remains flush or slightly lower than the top side of the cartridge 3200. The cartridge 3200 is then inserted into the loading zone 3102 of the extruder 3100 and the coupling member 3400 is set in place against the extruder 3100 and behind the cartridge 3200. With the plunger face 3302 making contact with the moldable material, the plunger assembly 3300 is used to push the modeling compound from the loading zone 3102 through the transition zone 3104, into the exit zone 3106 and out of the extruder 3100.

The inventors have found that this extruder assembly 3000 is extremely easy to use and can be operated by small children. In fact, the inventors could use as little as 2 fingers to grasp the handle 3304 and turn the plunger rod 3303 to extrude significant quantities of modeling compound.

The entire unit was fabricated from High Density Polyethylene (HDPE) material purchased from McMaster-Carr Supply Company (Elmhurst, Ill.) except for the plunger rod 3303, which was made from Nylon, also purchased from McMaster Carr.

Example 6

Extruder Assembly with Screw Cap

Figure 19:
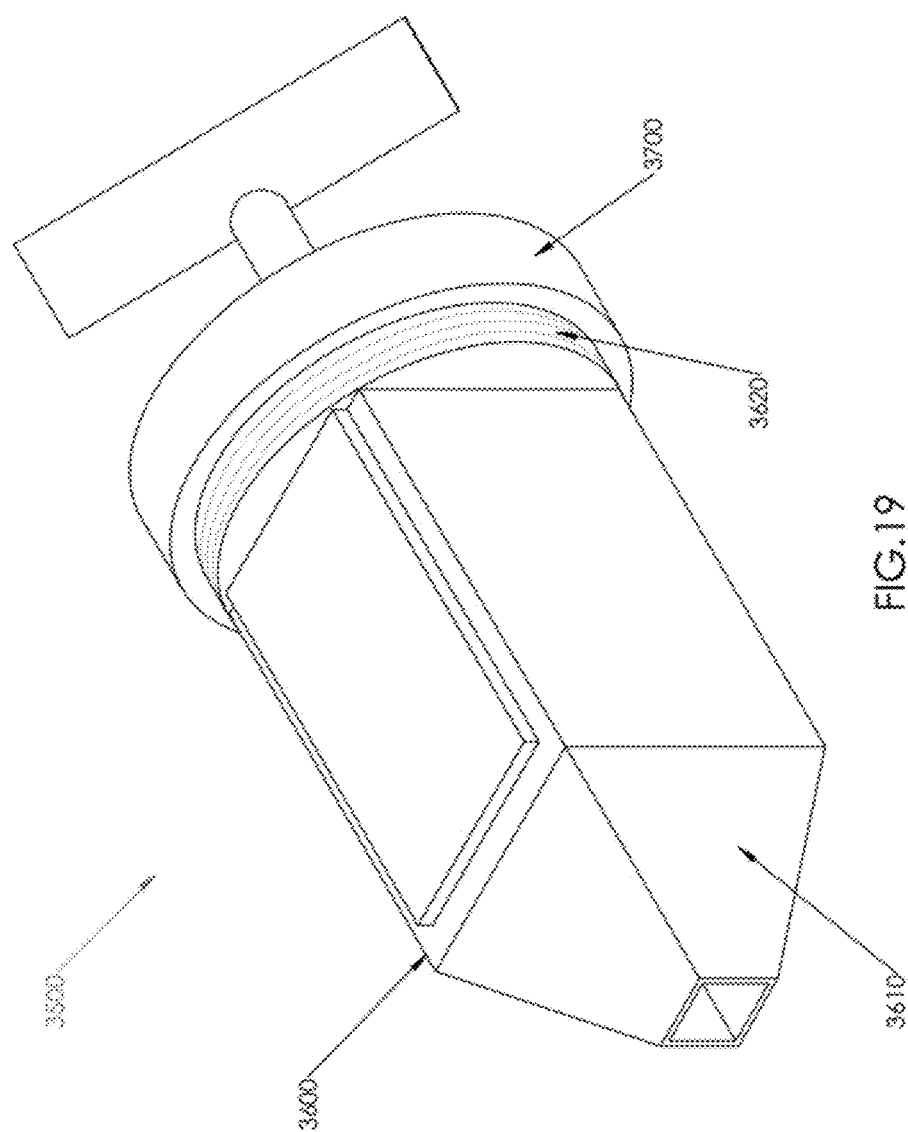
FIG. 19 is a perspective view of an extruder assembly used in accordance with an embodiment of the present invention.

FIG. 19 shows a perspective view of an extruder assembly 3500 that provides easy operation for use with modeling compound. The extruder assembly 3500 is similar in design to the extruder assembly 3000 shown in FIGS. 16 through 18, except for two primary differences. First, instead of using coupling member 3400 with a frame and detents, a screw cap 3700 is included. The extruder 3600 includes a mating thread 3620 on outer portion of the loading section that operatively couples to the screw cap 3700. Second, because detents are not used, the front of the extruder 3600 can be machined or otherwise fabricated such that the outer portion of the transition section 3610 is tapered.

Example 7

Extrusion Workshop

Figure 20:
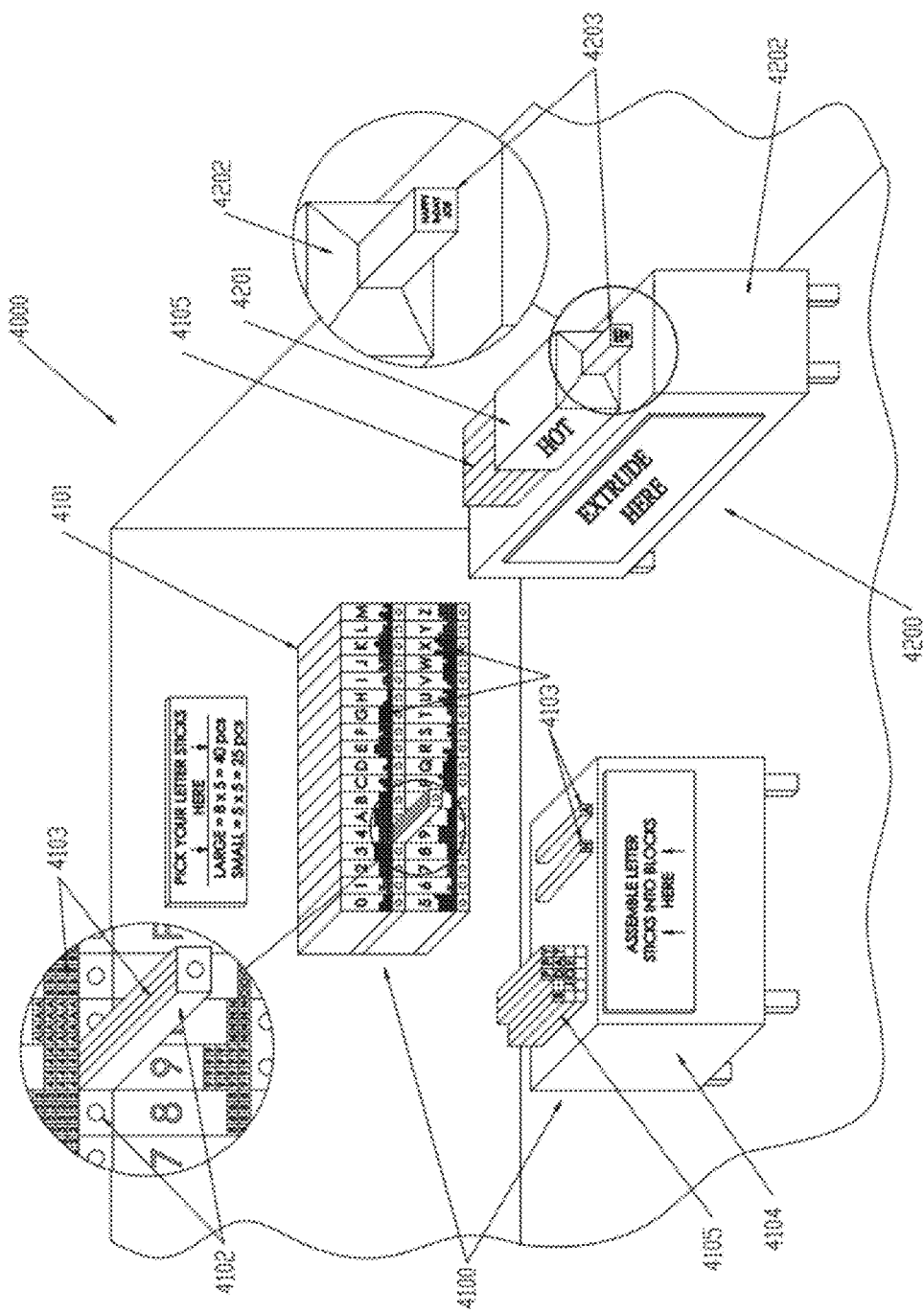
FIG. 20 shows an Extrusion Workshop in accordance with the embodiment of the present invention

Referring now to FIG. 20, a do-it-yourself workshop 4000 is shown. The do-it-yourself workshop 4000 includes a billet station 4100 that includes an inventory cabinet 4101 with a plurality of individual drawers 4102, with each drawer 4102 containing one or more color segments and/or graphic segments 4103, and an assembly area 4104 where the color segments and/or graphic segments 4103 are assembled into a moldable billet 4105; an extrusion station 4200 where the moldable billet 4105 is loaded into an extruder 4201 which rests on an extruding table 4202. The moldable billet 4105 is then extruded by the extruder 4201 to produce an elongated extrusion product 4203. The elongated extrusion product 4203 has a cross sectional area less than that of the moldable billet 4105. Also included in the do-it-yourself workshop 4000, but not shown in the figure, is a cutting station where the elongated extrusion product 4203 is cut into sections generally across the cross-section of the elongated extrusion product 4203, such that the cut segments of the elongated extrusion product 4203 are more convenient, for example to fit in ones mouth for consumption or to transport for further cutting or size reduction. The cutting station may include a simple cutting device such as a knife or it may be more complex and incorporate a device designed to sheer the elongated extrusion product 4203 in a high-speed process.

ADDITIONAL FEATURES AND OPTIONS OF THE INVENTION

Adjusting the Size of Molded Materials

The inventors have discovered that for a fixed exit velocity of the moldable material exiting an extruder, a conveyor can be used to adjust the size of the extruded material. It is possible to increase the size of the extruded material and it is possible to decrease the size of the extruded material, depending on the relative speed of the conveyor. This requires that the conveyor is made out of a material that causes the extruded material to slightly stick to the surface or has a large enough contact friction or tackiness that, over some length the moldable material, does not slip on the conveyor. This limits the ability of the material exiting the extruder to flow freely. If it is desired to increase the cross sectional area of the extruded material, the conveyor is operated at a velocity that is slower than the velocity of the material exiting the extruder. If it is desired to decrease the cross sectional area of the extruded material, the conveyor is operated a velocity that is faster than the velocity of the material exiting the extruder.

In one experiment at room temperature of approximately 20 C, the inventors found that a modeling compound exiting an extruder with a generally square section with sides approximately 6.4 mm in length at a velocity of approximately 1.5 cm/s could be reduced to about 5.5 mm per side on the cross section when the conveyor was operating at 1.9 cm/s and as large as 8.2 mm per side when the conveyor was operated about 1.12 cm/s.

Maintaining a Consistent Product from an Extruder or Roller

A load cell or other force measurement device may be used to continually monitor the force being applied to an extruder. An electronic control feedback system used to maintain a constant force, as is well known in the art of control electronics. This may improve product quality.

Optical systems may also be used to ensure product quality. For example, optical detection systems, such as that know as a "Machine Vision" system in the art of electronic control systems, or simple light detection devices or arrays, can be used to ensure that the size of the product is maintained at or near a predetermined value. Control algorithms can adjust the force being exerted, and/or the velocity of the plunger or roller, and/or relative speed of a conveyor or other receiving device and/or other parameters that are used in production such that the product quality is maintained as desired.

Design Features of an Extruder

As noted above, the internal corners for a square extruder can be rounded. The inventors have found that rounded corners lead to an aesthetically pleasing product, also allowing for a higher rate of production. If rounded corners are employed to create a higher quality product, preferably, a corner radius of 0.1 mm to 10 mm is used, more preferably 0.1 mm to 1 mm.

It should be noted that the length of the exit section of an extruder may be zero or nearly zero, but is included in the description as it is nearly a practicality of manufacturing to have an exit section with a length greater than zero.

Although the invention has been described with respect to specific preferred embodiments for a complete and clear disclosure, the appended claims are not to be thus limited but are to be construed as embodying all modifications and alternative constructions that may occur to one skilled in the art and which fairly fall within the basic teaching therein set forth.

What is claimed is:

1. An extrusion kit comprising:
    an assortment of moldable segments selectable for arrangement by a user to create a moldable billet having a cross-sectional graphic distributed over a longitudinal extent of the moldable billet; and
    an inanimate extruder configured to receive the moldable billet, the extruder being operable to extrude the moldable billet to form an elongated extrusion wherein the cross-sectional graphic is substantially present in the extrusion in reduced scale, wherein the extruder includes:
    a cartridge including a pair of side walls connected by a bottom wall and a rear wall, the cartridge having an open front end and an open top;
    a hollow body removably receiving the cartridge, the hollow body forming a tapered passage adjacent the open front end of the cartridge;
    a plunger including a plunger plate fitted to and received by the cartridge, a plunger rod extending through the rear wall of the cartridge to drivably engage the plunger plate, and a handle on the plunger rod at a location outside the cartridge, the handle being manually operable to advance the plunger rod and plunger plate in a forward axial direction toward the tapered passage; and
    a coupling member operable to releasably secure the cartridge and the hollow body against movement in the forward axial direction and in a direction opposite of the forward axial direction;
    wherein a material to be extruded is loadable into the cartridge through the open top of the cartridge.

2. The kit according to claim 1, wherein at least one moldable segment in the assortment of moldable segments includes a respective cross-sectional graphic, wherein the respective cross-sectional graphic is an alphanumeric character or pictorial symbol.

3. The kit according to claim 2, wherein the assortment of moldable segments includes a plurality of moldable segments whose respective cross-sectional graphics collectively comprise all the letters of the alphabet.

4. The kit according to claim 2, wherein the assortment of moldable segments includes a plurality of moldable segments whose respective cross-sectional graphics collectively comprise all the numeric digits.

5. The kit according to claim 1, wherein the assortment of moldable segments includes at least one moldable segment having a first color and at least one other moldable segment having a second color different from the first color.

6. The kit according to claim 5, wherein the assortment of moldable segments are capable of arrangement by the user as pixels to create the moldable billet having the cross-sectional graphic.

7. The kit according to claim 1, further comprising a cutter operable to cut the elongated extrusion into a plurality of shorter pieces each exhibiting the cross-sectional graphic.

* * * * *